United States Patent
Dickinson et al.

(10) Patent No.: US 9,165,270 B2
(45) Date of Patent: Oct. 20, 2015

(54) PREDICTING LIKELIHOOD OF CUSTOMER ATTRITION AND RETENTION MEASURES

(75) Inventors: Jonathan Dickinson, Grove City, PA (US); Paritosh Desai, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 12/430,080

(22) Filed: Apr. 25, 2009

(65) Prior Publication Data

US 2009/0276289 A1    Nov. 5, 2009

(51) Int. Cl.
| | |
|---|---|
| G06Q 10/00 | (2012.01) |
| G06Q 10/06 | (2012.01) |
| G06Q 30/02 | (2012.01) |
| G06Q 10/04 | (2012.01) |

(52) U.S. Cl.
CPC ............ *G06Q 10/063* (2013.01); *G06Q 10/067* (2013.01); *G06Q 10/04* (2013.01); *G06Q 30/02* (2013.01); *G06Q 30/0201* (2013.01); *G06Q 30/0202* (2013.01)

(58) Field of Classification Search
CPC .............. G06Q 10/063; G06Q 10/067; G06Q 30/0201; G06Q 30/0202
See application file for complete search history.

(56) References Cited

U.S. PATENT DOCUMENTS

| | | |
|---|---|---|
| 3,017,610 A | 1/1962 | Auerbach et al. |
| 4,744,026 A | 5/1988 | Vanderbei |
| 4,862,357 A | 8/1989 | Ahlstrom et al. |
| 4,907,170 A | 3/1990 | Bhattacharya |
| 5,063,506 A | 11/1991 | Brockwell et al. |
| 5,117,354 A | 5/1992 | Long et al. |

(Continued)

FOREIGN PATENT DOCUMENTS

| | | |
|---|---|---|
| WO | WO 97/46950 | 12/1997 |
| WO | WO 98/53415 | 11/1998 |

(Continued)

OTHER PUBLICATIONS

Diebold, Francis X., "The Past, Present, and Future of Macroeconomic Forecasting" Economic Perspectives (IJEP), vol. 12, No. 2, pp. 175-192, Spring 1998.

(Continued)

*Primary Examiner* — William Brockington, III
(74) *Attorney, Agent, or Firm* — Rahan Uddin; RSW IPLaw Edell, Shapiro & Finnan, LLC

(57) ABSTRACT

The present invention relates to a system and method for customer retention. Historical transaction and customer data may be received from stores. Likewise, recent customer transaction data may be received from the stores. The transactions are linked to each customer. Attriters, historical customers who discontinued shopping, are identified. Next, risk factors for attrition may be identified by examining the attriters' transaction history for commonalities. From the risk factors a loss model may be generated. The loss model may be used, in conjunction with current transaction data, to generate the likelihood of loss for each of the current customers, which may then be reported. Retention measures may be generated for each customer by comparing the customer's transactions to the loss model and the risk factors. The retention measures may be outputted to the stores, and a price optimization system. Likewise, the retention measures may be validated by comparing actual customer loss to the loss model.

39 Claims, 34 Drawing Sheets

(56) References Cited

U.S. PATENT DOCUMENTS

| | | | |
|---|---|---|---|
| 5,189,606 A | 2/1993 | Burns et al. | |
| 5,212,791 A | 5/1993 | Damian et al. | |
| 5,249,120 A | 9/1993 | Foley | |
| 5,299,115 A | 3/1994 | Fields et al. | |
| 5,377,095 A | 12/1994 | Maeda et al. | |
| 5,459,656 A | 10/1995 | Fields et al. | |
| 5,521,813 A | 5/1996 | Fox et al. | |
| 5,615,109 A | 3/1997 | Eder | |
| 5,694,551 A | 12/1997 | Doyle et al. | |
| 5,712,985 A | 1/1998 | Lee et al. | |
| 5,732,401 A | 3/1998 | Conway | |
| 5,765,143 A | 6/1998 | Sheldon et al. | |
| 5,774,868 A | 6/1998 | Cragun et al. | |
| 5,790,643 A | 8/1998 | Gordon et al. | |
| 5,799,286 A | 8/1998 | Morgan et al. | |
| 5,822,736 A | 10/1998 | Hartman et al. | |
| 5,832,456 A | 11/1998 | Fox et al. | |
| 5,832,458 A | 11/1998 | Jones | |
| 5,873,069 A | 2/1999 | Reuhl et al. | |
| 5,878,400 A | 3/1999 | Carter, III | |
| 5,918,209 A | 6/1999 | Campbell et al. | |
| 5,933,813 A | 8/1999 | Teicher et al. | |
| 5,987,425 A | 11/1999 | Hartman et al. | |
| 6,009,407 A | 12/1999 | Garg | |
| 6,029,139 A | 2/2000 | Cunningham et al. | |
| 6,032,123 A | 2/2000 | Jameson | |
| 6,032,125 A | 2/2000 | Ando | |
| 6,044,357 A | 3/2000 | Garg | |
| 6,052,686 A | 4/2000 | Fernandez et al. | |
| 6,078,893 A | 6/2000 | Ouimet et al. | |
| 6,094,641 A | 7/2000 | Ouimet et al. | |
| 6,125,355 A | 9/2000 | Bekaert et al. | |
| 6,134,534 A | 10/2000 | Walker et al. | |
| 6,173,345 B1 | 1/2001 | Stevens | |
| 6,202,070 B1 | 3/2001 | Nguyen et al. | |
| 6,205,431 B1 | 3/2001 | Willemain et al. | |
| 6,219,649 B1 | 4/2001 | Jameson | |
| 6,308,162 B1 | 10/2001 | Ouimet et al. | |
| 6,321,207 B1 | 11/2001 | Ye | |
| 6,341,268 B2 | 1/2002 | Walker et al. | |
| 6,341,269 B1 | 1/2002 | Dulaney et al. | |
| 6,397,193 B1 | 5/2002 | Walker et al. | |
| 6,405,175 B1 | 6/2002 | Ng | |
| 6,430,539 B1 | 8/2002 | Lazarus et al. | |
| 6,456,986 B1 | 9/2002 | Boardman et al. | |
| 6,536,935 B2 | 3/2003 | Parunak et al. | |
| 6,546,387 B1 | 4/2003 | Triggs | |
| 6,553,352 B2 | 4/2003 | Delurgio et al. | |
| 6,567,824 B2 | 5/2003 | Fox | |
| 6,609,101 B1 | 8/2003 | Landvater | |
| 6,684,193 B1 | 1/2004 | Chavez et al. | |
| 6,697,824 B1 | 2/2004 | Bowman-Amuah | |
| 6,725,208 B1 | 4/2004 | Hartman et al. | |
| 6,731,998 B2 | 5/2004 | Walser et al. | |
| 6,735,572 B2 | 5/2004 | Landesmann | |
| 6,745,184 B1 | 6/2004 | Choi et al. | |
| 6,826,538 B1 | 11/2004 | Kalyan et al. | |
| 6,910,017 B1 | 6/2005 | Woo et al. | |
| 6,934,931 B2 | 8/2005 | Plumer et al. | |
| 6,965,867 B1 | 11/2005 | Jameson | |
| 6,988,076 B2 | 1/2006 | Ouimet | |
| 7,058,617 B1 | 6/2006 | Hartman et al. | |
| 7,062,447 B1 | 6/2006 | Valentine et al. | |
| 7,072,848 B2 | 7/2006 | Boyd et al. | |
| 7,092,929 B1 | 8/2006 | Dvorak et al. | |
| 7,155,402 B1 | 12/2006 | Dvorak | |
| 7,302,410 B1 | 11/2007 | Venkatraman et al. | |
| 7,899,691 B1 | 3/2011 | Lee et al. | |
| 2001/0014868 A1 | 8/2001 | Herz et al. | |
| 2002/0023001 A1 | 2/2002 | McFarlin et al. | |
| 2002/0042739 A1 | 4/2002 | Srinivasan et al. | |
| 2002/0042755 A1 | 4/2002 | Kumar et al. | |
| 2002/0046096 A1* | 4/2002 | Srinivasan et al. | 705/14 |
| 2002/0107819 A1 | 8/2002 | Ouimet | |
| 2002/0116348 A1 | 8/2002 | Phillips et al. | |
| 2002/0123930 A1 | 9/2002 | Boyd et al. | |
| 2002/0169657 A1 | 11/2002 | Singh et al. | |
| 2002/0198794 A1 | 12/2002 | Williams et al. | |
| 2003/0028437 A1 | 2/2003 | Grant et al. | |
| 2003/0158771 A1* | 8/2003 | Shen et al. | 705/10 |
| 2003/0177103 A1 | 9/2003 | Ivanov et al. | |
| 2003/0200135 A1* | 10/2003 | Wright | 705/10 |
| 2003/0200185 A1 | 10/2003 | Huerta et al. | |
| 2003/0220830 A1 | 11/2003 | Myr | |
| 2004/0039593 A1* | 2/2004 | Eskandari | 705/1 |
| 2004/0111358 A1 | 6/2004 | Lange et al. | |
| 2004/0243432 A1 | 12/2004 | Kelly et al. | |
| 2005/0096963 A1 | 5/2005 | Myr et al. | |
| 2005/0097028 A1* | 5/2005 | Watanabe et al. | 705/37 |
| 2005/0108070 A1 | 5/2005 | Kelly et al. | |
| 2006/0161504 A1 | 7/2006 | Walser et al. | |
| 2006/0224534 A1 | 10/2006 | Hartman et al. | |
| 2007/0100680 A1* | 5/2007 | Kumar et al. | 705/10 |
| 2008/0086429 A1 | 4/2008 | Venkatraman et al. | |
| 2008/0208677 A1* | 8/2008 | Mayr et al. | 705/10 |
| 2009/0106178 A1* | 4/2009 | Chu | 706/14 |

FOREIGN PATENT DOCUMENTS

| | | |
|---|---|---|
| WO | WO 00/70519 | 11/2000 |
| WO | WO 00/70556 | 11/2000 |

OTHER PUBLICATIONS

Montgomery: "The Impact of Micro-Marketing on Pricing Strategies", 1994 The University of Chicago vol. 55/12-A of Dissertation of Abstracts International, p. 3922 (Abstract Only).

Busch: "Cost Modeling as a Technical Management Tool", Research-Technology Management, Nov./Dec. 1994, vol. 37, No. 6, pp. 50-56.

Deighton, John, et al., "The Effects of Advertising on Brand Switching and Repeat Purchasing", Journal of Marketing Research, vol. XXXI, Feb. 1994, pp. 28-43.

Kadiyali et al., "Manufacturer-retailer Channel Interactions and Implications for channel Power: An Investigation of Pricing in Local Market", Marketing Science, Spring 2000, V. 19, Issue 2.

Andrew B. Gelman et al., "Bayesian Data Analysis", pp. 439-455, Chapman & Hall/CRC, First Edition 1995, Reprinted 2000.

Hillier, Frederick S., et al., "Introduction to Operations Research", McGraw-Hill, Inc., 1995, Sixth Edition, pp. 1-14.

"KhiMetrics Helps Retailers Increase Margins with Two New Tools for Their Retail Revenue Management Application Suite." PR Newswire, Mar. 1, 2001.

"KhiMetrics and Retek Form Marketing Alliance for Comprehensive Retail Pricing Solution." PR Newswire, Feb. 19, 2001.

Barth, Brad. "ShopKo Holds the Price Line." Daily News Record, p. 10, Oct. 4, 2000.

"Manugistics Agrees to Acquire Talus Solutions." PR Newswire, Sep. 21, 2000.

"Goodyear Implements Trilogy's MultiChannel Pricing Solution as Its Enterprise-Wide E-Pricer Platform." Business Wire, p. 2286, Jun. 27, 2000.

"IMRglobal Signs New Product Implementation Agreement with Retek to Improve Retail Pricing and Markdown Process." Business Wire, p. 1590, Jun. 7, 2000.

"New Tools for Modeling Elasticity, Optimizing Prices and Collecting Live Pricing from the Web to Debut at Retail Systems 2000 in Chicago." Business Wire, p. 1484, Apr. 18, 2000.

Smith et al., "A Discrete Optimization Model for Seasonal Merchandise Planning " Journal of Retailing, vol. 74, No. 2, p. 193(29), Summer 1998.

Barth, Brad, "Shopko Tests Automated Markdowns", WWD Oct. 4, 2000, pp. 1-3.

Cook, Martie, "Optimizing Space and Sales with Markdown Software", Office.com, May 31, 2000, p. 1.

"Essentus and Spotlight Solutions Partnership Delivers Precise Markdown Decisions", Business Wire, Apr. 17, 2000, 3 pages.

Melcer, Rachel, "Local Tech Firm Creates Retail Markdown Tool", Business Courier online, Mar. 24, 2000, pp. 1-4.

Technology Strategy Incorporated, www.grossprofit.com, Mar. 2, 2000, pp. 1-20.

(56) References Cited

OTHER PUBLICATIONS

Flanagan, David, "Javascript: The Definitive Guide, 3rd Edition," published by O'Reilly in Jun. 1998 (ISBN 1-56592-392-8) section 14.8.
Berners-Lee, T., "Hypertext Markup Language 2.0 Working Paper," Nov. 1995 (pp. 1-3).
Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).
Abraham, Magid M. and Leonard M. Lodish, "Promoter: An Automated Promotion Evaluation System," Marketing Science, vol. 6, No. 2, 1987 (p. 101-123).
Little, John D. C., "Brandaid: A Marketing-Mix Model, Part 1: Structure," Operations Research, vol. 23, No. 4, Jul.-Aug. 1975 (p. 628-655).
Cerf, Vinton G. and Robert E. Kahn, "A Protocol for Packet Network Interconnection," IEEE Transactions on Communications COM-22, May 1974, (p. 637-648).
Scherage, Dan, "You Do the Math", Chain Store Age, v76, n7, Jul. 2000.
"Gymboree Enhances Price Management", Retail Systems Alert, vol. 13, No. 6, Jun. 2000.
Binkley, James K., and John M. Connor, "Grocery Market Pricing and the New Competitive Environment." Journal of Retailing, v74, n2, Summer 1998.
"Merriam Webster's Collegiate Dictionary", 10th edition, p. 585, Merriam-Webster Incorporated, 1999.
Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.
A.F.M. Smith, "A General Bayesian Linear Model," University of Oxford, Apr. 1972.
Alan L. Montgomery and Peter R. Rossi, "Estimating Price Elasticities with Theory-Based Priors," Journal of Marketing Research vol. XXXVI, Nov. 1999 (pp. 413-423).
Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).
Alan L. Montgomery, "Creating Micro-Marketing Pricing Strategies Using Supermarket Scanner Data," Marketing Science, vol. 16, No. 4, 1997 (pp. 315-337).
Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).
Arnold Zellner, "On Assessing Prior Distributions and Bayesian Regression Analysis With G-Prior Distributions," Elsevier Science Publishers, 1986 (pp. 233-243).
D. V. Lindley and A.F.M. Smith, "Bayes Estimates for the Linear Model," University College, Dec. 1971.
George C. Tiao and Arnold Zellner, "On the Bayesian Estimation of Multivariate Regression," University of Wisconsin, Jan. 1964.
Arnold Zellner, "An Efficient Method of Estimating Seemingly Unrelated Regressions and Tests for Aggregation Bias," University of Wisconsin, Jun. 1962.
"PCT International Search Report", Application No. PCT/US03/30488, mailed Jan. 28, 2004.
"PCT International Search Report", Application No. PCT/US02/14977, mailed May 5, 2003.
Dyer, Robert F., et al., "Case Studies in Marketing Decisions Using Expert Choice" Decision Support Software, 1988, pp. 2-7, 73-108.
"PCT International Search Report", Application No. PCT/US02/36710, mailed Jul. 21, 2003.
Yoeman, John Cornelius, Jr. "The Optimal Offering Price for Underwritten Securities", vol. 55/01-A of Dissertation Abstracts International, p. 4743; 1993 (Abstract only).
"Pacificorp IRP: Renewables Costs Must Drop 65% To Be Competitive with Gas" McGraw-Hill Publications, Dec. 8, 1995.
"Report of Novelty Search" by Patentec, dated Feb. 9, 2001.
Rossi, Delurgio, & Kantor; "Making Sense of Scanner Data;" Harvard Business Review, Reprint F00205, 2000.
Bucklin & Gupta, "Brand Choice, Purchase Incidence, and Segmentation: An Integrated Modeling Approach," Journal of Marketing Research, May 1992, pp. 201-215, vol. XXIX.
Smith, Mathur, & Kohn; "Bayesian Semiparametric Regression: An Exposition and Application to Print Advertising;" Jan. 3, 1997; Australian Graduate School of Management, University of New South Wales, Sydney 2052, Australia.
Blattberg and Deighton, "Manage Marketing by the Customer Equity;" Harvard Business Review, Jul.-Aug. 1996, pp. 136-144.
Christen, Gupta, Porter, Staelin & Wittink; "Using Market-Level Data to Understand the Effectiveness of Promotional Activities;" Dec. 22, 1995.
Link, Ross; "Are Aggregate Scanner Data Models Biased?" Journal of Advertising Research, Sep./Oct. 1995, pp. RC8-RC12, ARF.
Russell & Kamakura, "Understanding Brand Competition Using Micro and Macro Scanner Data," Journal of Marketing Research, vol. XXXI (May 1994), pp. 289-303.
Jones, John Philip, "The Double Jeopardy of Sales Promotions," Harvard Business Review, Sep.-Oct. 1999, pp. 145-152.
Supplementary European Search Report, Application No. 02719197.2-2221, Feb. 2, 2007.
Buzzell, Quelch, and Salmon, "The Costly Bargain of Trade Promotion;" Harvard Business Review, reprint 90201, Mar.-Apr. 1990, pp. 1-9.
Curry, Divakar, Mathur, and Whiteman; "BVAR as a Category Management Tool: An Illustration and Comparison with Alternative Techniques;" Journal of Forecasting, vol. 14, Issue No. 3 (1995), pp. 181-199.
"Report of Novelty Search" by Patentec, dated Jul. 25, 2001.
Stephen J. Hoch et al., "Store Brands and Category Management", The Wharton School, University of Pennsylvania, Mar. 1998, pp. 1-38.
Bruce G.S. Hardie et al., "Attribute-based Market Share Models: Methodological Development and Managerial Applications", The Wharton School, University of Pennsylvania, Working Paper 98-009, pp. 1-48, 1998.
Alan Mercer, "Non-linear Price Effects", Journal of the Market Research Society, dated Jul. 1, 1996, p. 227.
Rockney G. Walters, "Assessing the Impact of Retail Price Promotions on Product Substitution, Complementary Purchase, and Interstore Sales Displacements", Journal of Marketing, vol. 55, Apr. 1991, pp. 17-28.
Robert C. Blattberg et al., "How Promotions Work", Marketing Science, vol. 14. No. 3, Part 2 of 2, 1995, pp. G122-G132.
Peter M. Guadagni et al., "A Logit Model of Brand Choice Calibrated on Scanner Data", Marketing Science, vol. 2, No. 3, Summer 1983, pp. 203-238.
Lee G. Cooper et al., "Standardizing Variables in Multiplicative Choice Models", Journal of Consumer Research, vol. 10, Jun. 1983, pp. 96-108.
Richard R. Batsell, et al., "A New Class of Market Share Models", Marketing Science, vol. 4, No. 3, Summer 1985, pp. 177-198.
Jagmohan S. Raju, "The Effect of Price Promotions on Variability in Product Category Sales", Marketing Science, vol. 11, No. 3, Summer 1992, pp. 207-220.
Robert J. Dolan, "How Do You Know When the Price is Right?", Harvard Business Review, Sep.-Oct. 1995, pp. 4-11.
Fusun Gonul, "Modeling Multiple Sources of Heterogeneity in Multinomial Logit Models: Methodological and Managerial Issues", Marketing Science, vol. 12, No. 3, Summer 1993, pp. 213-229.
Robert M. Schindler et al., "Increasing Consumer Sales Response Through Use of 99-Ending Prices", Journal of Retailing, Jun. 1, 1996, p. 187.
Francis J. Mulhern et al., "The Relationship between Retail Price Promotions and Regular Price Purchases", Journal of Marketing Research, vol. XXXI, Feb. 1994, pp. 28-43.
Sunil Gupta, "Reflections on 'Impact of Sales Promotions on When, What, and How Much to Buy'", Journal of Marketing Research, vol. XXX, Nov. 1993, pp. 522-524.
Richard A. Briesch, "Does It Matter How Price Promotions Are Operationalized?", Marketing Letters 8:2 (1997), pp. 167-181.

(56) References Cited

OTHER PUBLICATIONS

William R. Dillon et al., "A Segment-level Model of Category Volume and Brand Choice", Marketing Science, vol. 15, No. 1, 1996, pp. 38-59.

Stephen J. Hoch et al., Determinants of Store-Level Price Elasticity, Journal of Marketing Research, vol. XXXII (Feb. 1995), pp. 17-29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice Among SKUs", Journal of Marketing Research, vol. XXXIII (Nov. 1996), pp. 442-452.

PCT International Search Report & the Written Opinion of the International Searching Authority, Application No. PCT/US07/20678, mailed Feb. 26, 2008.

Byung-Do Kim et al., "Modeling the Distribution of Price Sensitivity and Implications for Optimal Retail Pricing", Journal of Business & Economic Statistics, Jul. 1995, vol. 13, No. 3.

* cited by examiner

PREDICTING LIKELIHOOD OF CUSTOMER ATTRITION AND RETENTION MEASURES

CROSS REFERENCE TO OTHER APPLICATIONS

U.S. application Ser. No. 09/741,956 filed on Dec. 20, 2000, entitled "Econometric Engine", now U.S. Pat. No. 7,899,691, is hereby fully incorporated by reference.

BACKGROUND OF THE INVENTION

The present invention relates to a system and methods for a business tool for determining likelihood of customer attrition, and developing retention stratagems to prevent the customer loss. This business tool may be stand alone, or may be integrated into a pricing optimization system to provide more effective pricing of products. More particularly, the present customer attrition identifier and retainer system may predict a particular customer's likelihood of loss and develop measures which retain the customer before any significant financial loss is experienced from the customer's changing behaviors.

For a business to properly and profitably function there must be relatively constant customer base to ensure a steady revenue stream. For businesses that cater to short-lifespan consumer goods, profitability is only assured when there is repeated customer patronage. Examples of such businesses that rely upon repeated consumer visits include supermarket and food sellers, department stores, movie theaters, most restaurants, and all other "small item" sellers.

To ensure a constant consumer base, businesses may engage in campaigns intended to draw more customers. Additionally, businesses rely upon customer retention and loyalty to maintain existing customers.

It has been traditionally the case that retaining an existing customer is significantly less costly than getting a new customer. In many businesses, this expense discrepancy between getting a new customer and keeping an old customer may be as high as an order of magnitude. Thus, many companies and businesses have attempted to generate the best customer service economically possible, reduce prices and develop a pleasurable shopping experience in order to keep existing customers.

However, such global means of customer retention may not be adequate to retain all customers. All businesses have some level of customer attrition. In the supermarket industry, there may be a loss of roughly 3% to 20% of customers. This loss rate may vary on business locale, type, quality and business model. This customer loss may cost a business dearly over the long term in lost patronage, referrals, and costs associated with generating new customers.

Traditionally, to prevent this customer loss, or attrition, a business simply "tried its best" to ensure good customer relations, and when a disgruntled customer was identified, a manager or similar employee would spend individual attention with the upset customer to appease him, and hopefully maintain that customer's loyalty.

The problem with traditional customer retention practices is that it suffers from diminishing returns. Enhancing customer service greatly above industry standards may result in a reduction in customer loss, for example, from 6% to 4%; however, the costs of a global improvement in customer service may greatly outweigh these gains. Thus, most businesses maintain a level of customer service which optimally balances costs and retention. Further reduction in retention is uneconomical due to diminishing returns of global customer retention measures.

However, the cost of customer retention may be greatly reduced if the business is able to target the customer who is likely to leave. Thus, the upset customer may receive a discount, or "freebie", and enhanced employee attention in order to keep the customer. This level of customer service is uneconomical on a global scale; however, when an upset or disgruntled customer is identified, such more costly retention measures may be economically applied.

Unfortunately for businesses, determining the customers who are likely to leave traditionally required the customer to become upset enough to communicate their displeasure with the business. Alternatively, identification by the business of customers likely to leave has typically relied upon frequency measures of a customer's patronage. While these frequency measures are very accurate, leaving customers are only identified after loss has occurred. At this point, retaining the customer may not be possible.

Were the likelihood of attrition of the customer determinable before loss occurs, more effective retention measures would be able to be imposed.

It is therefore apparent that an urgent need exists for improved customer retention methods. This improved customer retention requires accurately predicting a customer's likelihood of attrition before significant customer loss has occurred. This customer retention system would be able to provide businesses with an advanced competitive tool to greatly reduce customer loss in a cost efficient manner.

SUMMARY OF THE INVENTION

To achieve the foregoing and in accordance with the present invention, a system and method for customer retention is provided. In particular, the system and methods relies upon a highly predictive measure of customer likelihood of loss. Such systems are useful for providing businesses with an advanced competitive tool to greatly reduce customer loss in a cost efficient manner.

The system and method for customer retention looks to a set of customers. Historical data from at least one store may be received. This data includes historical transaction data of old customers. Likewise, recent customer data may be received from the at least one store. This data includes transactions for the present customers.

The transactions need to be linked to each customer. This linking may utilize any of payment identifiers, loyalty program identifiers, registry identifiers, or biometric identifiers. If there are conflicts between the identifiers, the conflict may be resolved in favor of the most accurate identifier.

Next attriters are identified. The attriters may be defined as the historical customers who discontinued shopping at the at least one store during the historical data period. Attriters may, alternatively, be defined as customers whose spend has decreased by a threshold percentage, such as 50% reduction in spend. Likewise, attriters may be defined as customers who stop shopping in a particular product category. Thus, it is within the spirit of the invention that attriter criteria be configurable to meet a retailer's needs or specifications. Next, risk factors for attrition may be identified in the historical data. These risk factors may be generated by examining the transaction history of attriters for commonalities which are statistically significant from the transaction history for non attriters. The risk factors include at least one of behavioral categories, tenure, basket value, number of adults, available customer information, number of stored shopped at, store quality, competitor type, and gaps in shopping frequency.

From the risk factors, a loss model may be generated. In some embodiments, the loss model may be calibrated by discounting the frequency risk factor of the attriters after date of attrition.

The loss model may be used, in conjunction with current transaction data, to generate the likelihood of loss for each of the current customers. This likelihood of loss for each customer may then be reported.

At least one retention measure may be generated for each customer by comparing the customer's transactions to the loss model and the risk factors. The retention measures may be outputted to the stores, and may be sent to a price optimization system. Likewise, the retention measures may be validated by applying them, calculating actual customer loss and comparing the actual customer loss to the loss model.

In some embodiments, high value customers may first be identified. These high value customers provide the stores more economic value than most customers. Retention measures may be implemented for only some customers dependent upon the amount of value they represent to the stores. Additionally, a loss value may be generated for each customer by comparing the likelihood of loss for said customer with the economic value said customer provides the stores.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to a system and methods for a business tool for determining likelihood of customer attrition, and developing retention stratagems to prevent the customer loss. This business tool may be stand alone, or may be integrated into a pricing optimization system to provide more effective pricing of products. For example, the likelihood of customer attrition data may be incorporated into price optimization by focusing upon at risk customers. More particularly, the present customer attrition identifier and retainer system may predict a particular customer's likelihood of loss and develop measures which retain the customer before any significant financial loss is experienced from the customer's changing behaviors.

Figure 1:
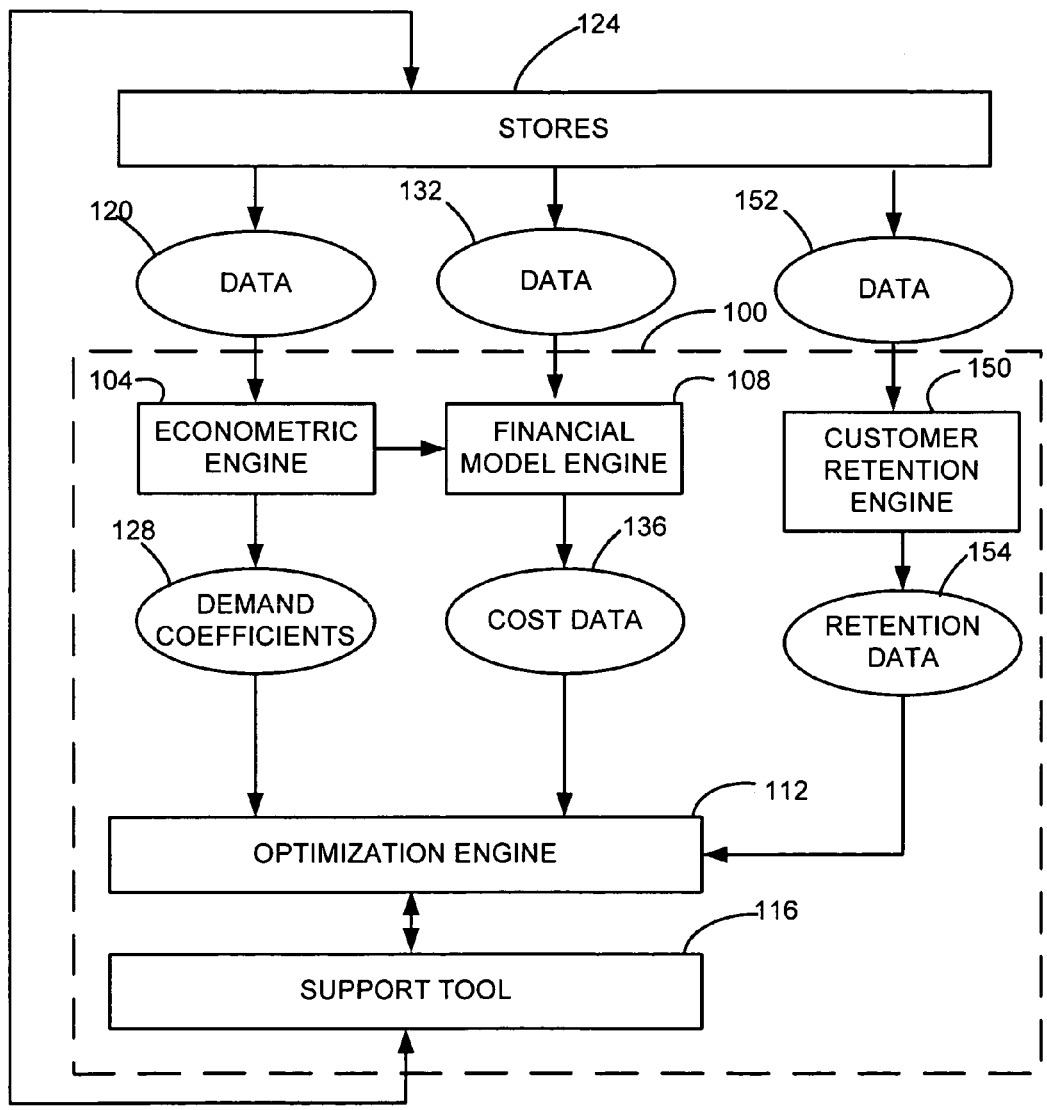
FIG. 1 is a high level schematic view of an embodiment of a price optimization system with an integrated customer retention system.
Figure 2:
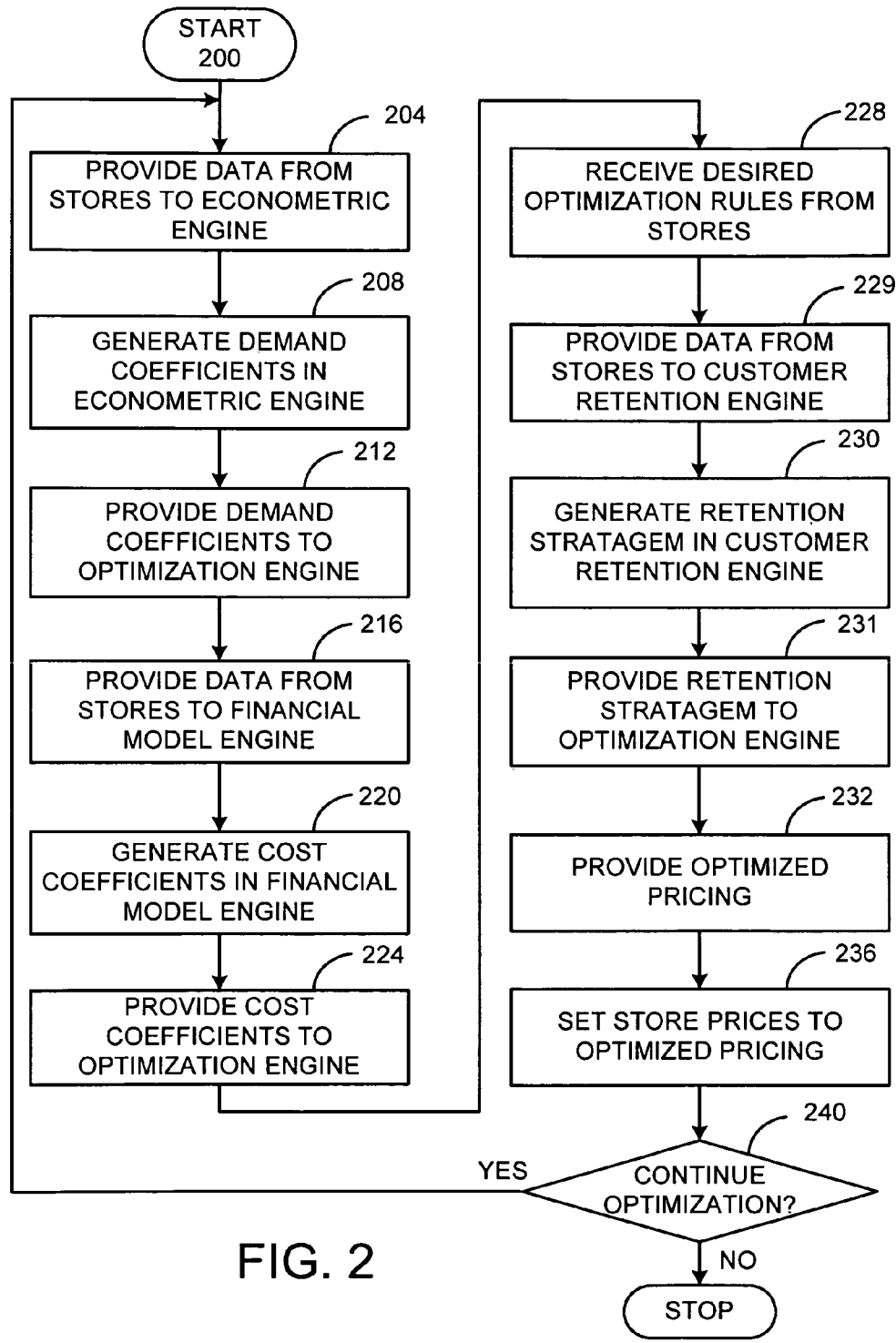
FIG. 2 is high level flow chart of an optimization process with integrated customer retention.

To facilitate discussion, FIGS. 1 and 2 show a customer retention engine coupled to an optimization system and methods for such a system. FIGS. 3-6 illustrate the optimization system and methods in more detail. General computer systems for the optimization system and retention system may be seen at FIGS. 7 and 8. FIGS. 9 to 12 illustrate data error correction for optimization. FIGS. 13-20 show various pricing optimization processes.

FIGS. 21 to 24 detain the customer retention engine. Likewise, FIGS. 25 to 30 illustrate the method of determining a customer's attrition likelihood and development of a retention stratagem. Lastly, FIGS. 31A to 32 illustrate retention factors for the modeling of a customer's likelihood of loss.

Although useful for determining an individuals likelihood of attrition for virtually any reason, group or organization, the Customer Retention Engine 150 described below demonstrates particular utility for determining customer attrition likelihood in a consumer setting. Additionally, when coupled to an optimization system as illustrated at FIG. 1, the Customer Retention Engine 150 may function as a particularly effective business tool.

The following description of some embodiments of the present invention will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Optimization System Overview

To facilitate discussion, FIG. 1 is a schematic view of a Price Optimizing System with Active Customer Retention 100. The Price Optimizing System with Active Customer Retention 100 comprises an Econometric Engine 104, a Financial Model Engine 108, an Optimization Engine 112, a Support Tool 116, and a Customer Retention Engine 150. The Econometric Engine 104 is connected to the Optimization Engine 112, so that the output of the Econometric Engine 104 is an input of the Optimization Engine 112. The Financial Model Engine 108 is connected to the Optimization Engine 112, so that the output of the Financial Model Engine 108 is an input of the Optimization Engine 112. Likewise, the Customer Retention Engine 150 is connected to the Optimization Engine 112, so that the output of the Financial Model Engine 108 is an input of the Optimization Engine 112.

The Optimization Engine 112 is connected to the Support Tool 116 so that output of the Optimization Engine 112 is provided as input to the Support Tool 116 and output from the Support Tool 116 may be provided as input to the Optimization Engine 112. The Econometric Engine 104 may also exchange data with the Financial Model Engine 108.

FIG. 2 is a high level flow chart of a process that utilizes the Price Optimizing System with Active Customer Retention 100, The operation of the Price Optimizing System with Active Customer Retention 100 will be discussed in general here and in more detail further below. Data 120 is provided from the Stores 124 to the Econometric Engine 104 (step 204). Generally, the data 120 provided to the Econometric Engine 104 may be point-of-sale information, product information, and store information. The Econometric Engine 104 processes the data 120 to provide demand coefficients 128 (step 208) for a set of algebraic equations that may be used to estimate demand (volume sold) given certain marketing conditions (i.e., a particular store in the chain), including a price point. The demand coefficients 128 are provided to the Optimization Engine 112 (step 212).

Additional processed data from the Econometric Engine 104 may also be provided to the Optimization Engine 112. The Financial Model Engine 108 may receive data 132 from the Stores 124 (step 216) and processed data from the Econometric Engine 104. The data 132 received from the stores is generally cost related data, such as average store labor rates, average distribution center labor rates, cost of capital, the average time it takes a cashier to scan an item (or unit) of product, how long it takes to stock a received unit of product and fixed cost data. The Financial Model Engine 108 may process the data to provide a variable cost and fixed cost for each unit of product in a store (step 220) The processing by the Econometric Engine 104 and the processing by the Financial Model Engine 108 may be done in parallel. Cost data 136 is provided from the Financial Model Engine 108 to the Optimization Engine 112 (step 224). The Optimization Engine 112 utilizes the demand coefficients 128 to create a demand equation. The optimization engine is able to forecast demand and cost for a set of prices to calculate net profit. The Stores 124 may use the Support Tool 116 to provide optimization rules to the Optimization Engine 112 (step 228).

The data 152 regarding customer purchasing may be provided from the Stores 124 to the Customer Retention Engine 150 (step 229). Customer data 152 may include purchasing frequency, items purchased and some identifier linking the purchase to the particular customer. The Customer Retention Engine 150 may process the data 152 to generate a customer retention stratagem (step 230). This stratagem may include customer specific promotions as well as general promotions or modifications to the optimization rules. This generated retention stratagem data Retention Data 154 may then be provided to the Optimization Engine 112 (step 231).

The Optimization Engine 112 may use the demand equation, the variable and fixed costs, the rules, and retention data to compute an optimal set of prices that meet the rules (step 232). For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices that allow for the promotion of the one product and the maximization of profit under that condition. In the specification and claims, the phrases "optimal set of prices" or "preferred set of prices" are defined as a set of computed prices for a set of products where the prices meet all of the rules. The rules normally include an optimization, such as optimizing profit or optimizing volume of sales of a product and constraints such as a limit in the variation of prices. The optimal (or preferred) set of prices is defined as prices that define a local optimum of an econometric model which lies within constraints specified by the rules When profit is maximized, it may be maximized for a sum of all measured products.

Such a maximization may not maximize profit for each individual product, but may instead have an ultimate objective of maximizing total profit. The optimal (preferred) set of prices may be sent from the Optimization Engine 112 to the Support Tool 116 so that the Stores 124 may use the user interface of the Support Tool 116 to obtain the optimal set of prices. Other methods may be used to provide the optimal set of prices to the Stores 124. The price of the products in the Stores 124 are set to the optimal set of prices (step 236), so that a maximization of profit or another objective is achieved.

Each component of the Price Optimizing System with Active Customer Retention 100 will be discussed separately in more detail below.

II. Econometric Engine

Figure 3:
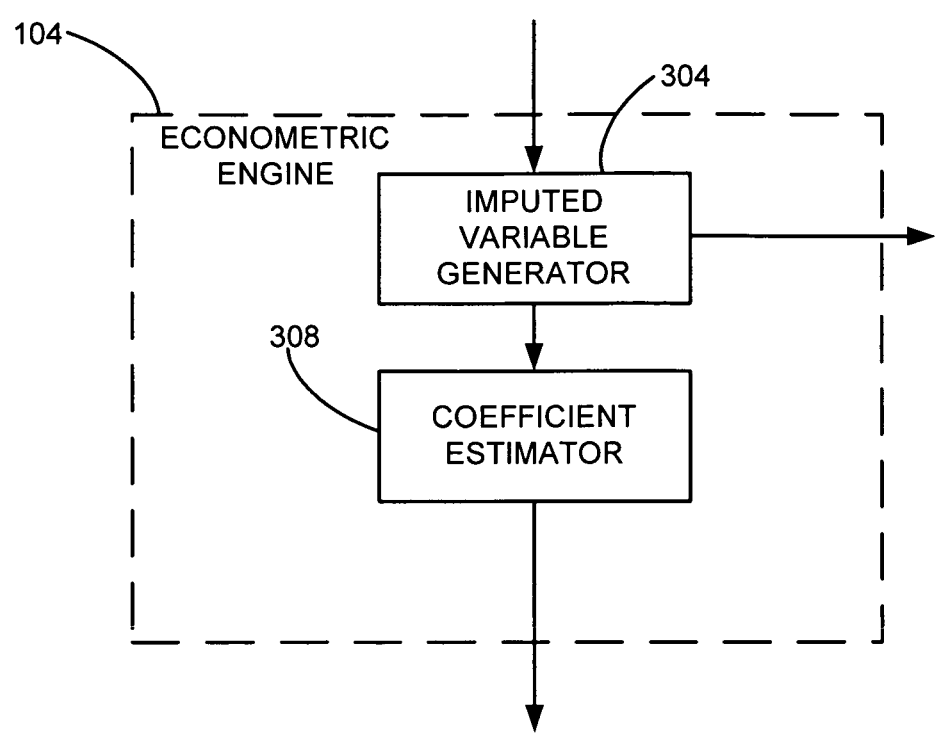
FIG. 3 is a more detailed schematic view of the econometric engine.

FIG. 3 is a more detailed view of the Econometric Engine 104. The econometric engine comprises an Imputed Variable Generator 304 and a Coefficient Estimator 308. The data 120 from the Stores 124 is provided to the Imputed Variable Generator 304. The data 120 may be raw data generated from cash register data, which may be generated by scanners used at the cash registers.

A. Imputed Variable Generator

The present invention provides methods, media, and systems for generating a plurality of imputed econometric variables. Such variables are useful in that they aid businesses in determining the effectiveness of a variety of sales strategies. In particular, such variables can be used to gauge the effects of various pricing or sales volume strategies.

Figure 10:
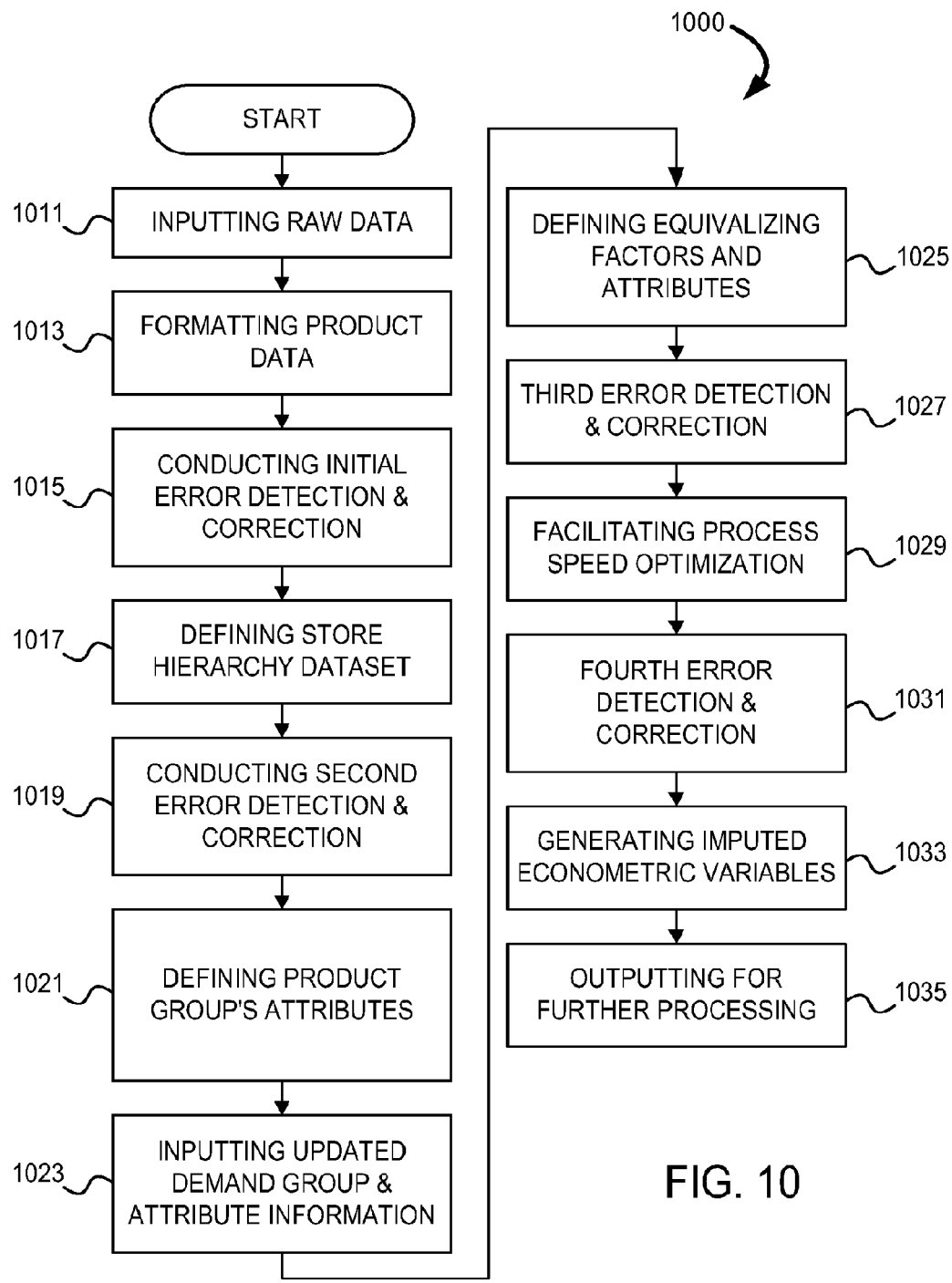
FIG. 10 is a flow chart depicting a process flow by which raw econometric data can be input, subject to "cleansing", and used to create an initial dataset which can then be used to generate imputed econometric variables in accordance with some embodiment of the present invention.

FIG. 10 illustrates a flowchart 1000 which describes steps of a method embodiment for data cleansing imputed econometric variable generation in accordance with the principles of the present invention. The process, generally described in FIG. 10, begins by initial dataset creation and data cleaning (Steps 1011-1031). This data set information is then used to generate imputed econometric variables (Step 1033) which can be output to and for other applications (Step 1035). Likewise, such dataset correction and cleansing 1. Initial Dataset Creation and Cleaning The process of dataset creation and cleaning (that is to say the process of identifying incompatible data records and resolving the data incompatibility, also referred to herein as "error detection and correction") begins by inputting raw econometric data (Step 1011). The raw econometric data is then subject to formatting and classifying by UPC designation (Step 1013). After formatting, the data is subject to an initial error detection and correction step (Step 1015). Once the econometric data has been corrected, the store information comprising part of the raw econometric data is used in defining a store data set hierarchy (Step 1017). This is followed by a second error detecting and correcting step (Step 1019). In some embodiments, this is followed by defining a group of products which will comprise a demand group (i.e., a group of highly substitutable products) and be used for generating attribute information (Step 1021). Based on the defined demand group, the attribute information is updated (Step 1023). The data is equivalized and the demand group is further classified in accordance with size parameters (Step 1025). The demand group information is subjected to a third error detection and correction step (Step 1027). The demand group information is then manipulated to facilitate decreased process time (Step 1029). The data is then subjected to a fourth error detection and correction step (Step 1031), which generates an initial cleansed dataset. Using this initial cleansed dataset, imputed econometric variables are generated (Step 1033). Optionally, these imputed econometric variables may be output to other systems for further processing and analysis (Step 1035).

While this exemplary process of generating an initial dataset with cleansing is provided with some degree of detail, it is understood that the process for predicting customer loss and customer retention strategy generation may be performed with a variety of optimization systems. This includes systems where, for example, demand groups are not generated, and where alternative methods of data set generation are employed.

The process begins by inputting raw econometric data (Step 1011). The raw econometric data is provided by a client. The raw econometric data includes a variety of product information, including, but not limited to, the store from which the data is collected, the time period over which the data is collected, a UPC (Universal Product Code) for the product, and provide a UPC description of the product. Also, the raw econometric data must include product cost (e.g., the wholesale cost to the store), number of units sold, and either unit revenue or unit price. Also, the general category of product or department identification is input. A category is defined as a set of substitutable or complementary products, for example, "Italian Foods". Such categorization can be proscribed by the client, or defined by generally accepted product categories. Additionally, such categorization can be accomplished using look-up tables or computer generated product categories.

Also, a more complete product descriptor is generated using the product information described above and, for example, a UPC description of the product and/or a product description found in some other look-up table (Step 1013).

The data is then subjected to a first error detection and correction process (Step 1015). Typically, this step includes the removal of all duplicate records and the removal of all records having no match in the client supplied data (typically scanner data).

Data subsets concerning store hierarchy are defined (Step 1017). This means stores are identified and categorized into various useful subsets. These subsets can be used to provide information concerning, among other things, regional or location specific economic effects.

The data is then subjected to a second error detection and correction process (Step 1019). This step cleans out certain obviously defective records. Examples include, but are not limited to, records displaying negative prices, negative sales volume, or negative cost. Records exhibiting unusual price information, determined through standard deviation or cross store comparisons, are also removed.

This is followed by defining groups of products and their attributes and exporting this information to a supplementary file (e.g., a text file) (Step 1021). This product information can then be output into a separate process which can be used to define demand groups or product attributes. For example, this supplemental file can be input into a spreadsheet program (e.g., Excel®) which can use the product information to define "demand groups" (i.e., groups of highly substitutable products). Also, further product attribute information can be acquired and added to the supplementary file. In addition, updated demand group and attribute information can then be input as received (Step 1023). By maintaining a supplementary file containing large amounts of data, a more streamlined (abbreviated) dataset may be used in processing, thereby effectively speeding up processing time.

The data is further processed by defining an "equivalizing factor" for the products of each demand group in accordance with size and UOM parameters (Step 1025). This equivalizing factor can be provided by the client or imputed. An equivalizing factor can be imputed by using, for example, the median size for each UOM. Alternatively, some commonly used arbitrary value can be assigned. Once this information is gathered, all product prices and volume can be "equivalized". Chiefly, the purpose of determining an equivalizing factor is to facilitate comparisons between different size products in a demand group.

The data is then subjected to a third error detection and correction process, which detects the effects of closed stores and certain other erroneous records (Step 1027). In accord with the principles of the invention, stores that demonstrate no product movement (product sales equal to zero) over a predetermined time period are treated as closed. Those stores and their records are dropped from the process. The third error detection and correction also includes analysis tools for detecting the presence of erroneous duplicate records. A further correction can be made for records having the same date and causal value but have differing prices or differing number of units sold.

After all the duplicate records are eliminated, the data is reconstructed. The data can be reviewed again to insure all duplicates are removed. Optionally, an output file including all discrepancies can be produced. In the event that it becomes necessary, this output file can be used as a follow-up record for consulting with the client to confirm the accuracy of the error detection and correction process.

Additionally, reduced processing times may be achieved by reformatting the data (Step 1029). For example, groups of related low sales volume products (frequently high priced items) can optionally be aggregated as a single product and processed together. Additionally, the data may be split into conveniently sized data subsets defined by a store or groups of stores which are then processed together to shorten the processing times.

Next the process includes determining the nature of missing data records in a fourth error detection and correction step (Step 1031). The missing data records are analyzed again before finally outputting a cleansed initial dataset. For example, data collected over a modeled time interval is analyzed by introducing the data into a data grid divided into a set of time periods. For the time periods having no records a determination must be made. Is the record missing because:

a. there were no sales of that product during that week (time period);

b. the product was sold out and no stock was present in the store during that time period (this situation is also referred to herein as a "stock-out');

c. the absence of data is due to a processing error.

Figure 11:
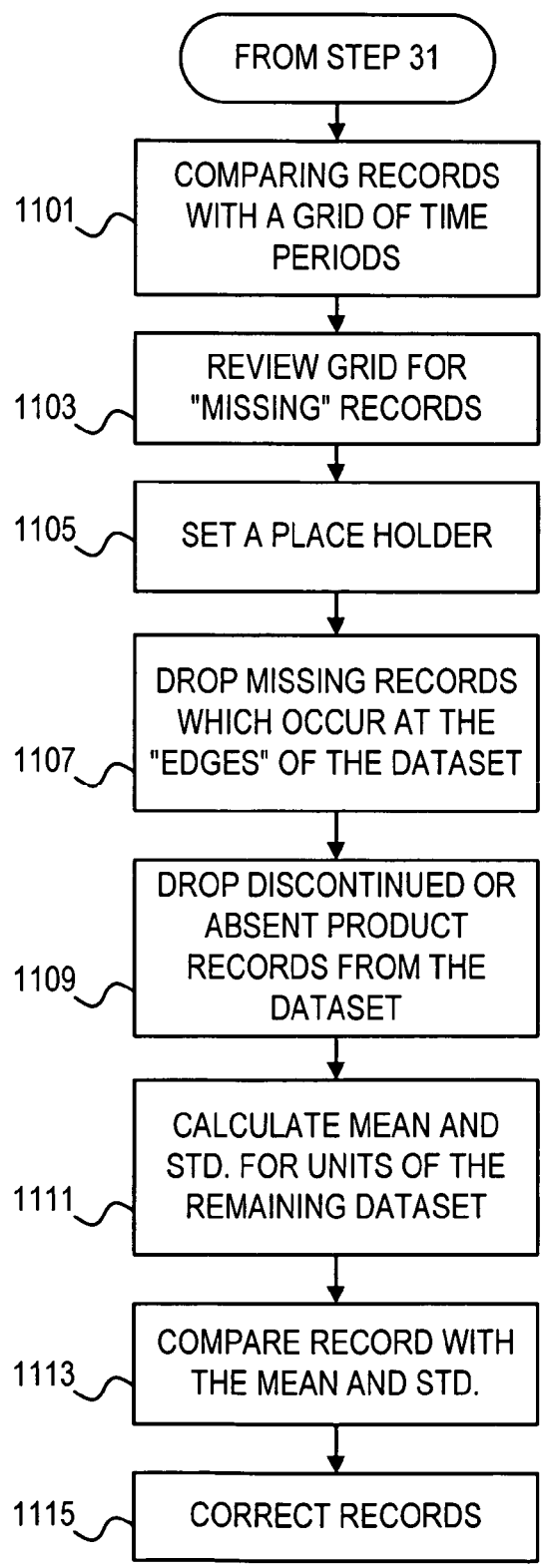
FIG. 11 is a flow chart depicting a process flow depicting a process by which partially cleansed econometric data is subject to further error detection and correction in accordance with some embodiment of the present invention.

FIG. 11 depicts an exemplary process flow embodiment for determining the nature of missing data records in a fourth error detection and correction step in accordance with the principles of the present invention. The records are compared to a grid of time periods (Step 1101). The grid is reviewed for missing records with respect to a particular store and product (Step 1103). These missing records are then marked with a placeholder (Step 1105). Missing records at the "edges" of the dataset do not significantly affect the dataset and are deleted (Step 1107). Records for discontinued products or products recently introduced are dropped for those time periods where the product was not carried in the Store (Step 1109). The remaining dataset is processed to determine an average value for units (sold) and a STD for units (Step 1111). Each missing record is compared to the average units (Step 1113) and based on this comparison, a correction can be made (Step 1115).

The net result of execution of the process Steps 1011-1031 disclosed hereinabove is the generation of a cleansed initial dataset which can be used for its own purpose or input into other econometric processes. One such process is the generation of imputed econometric variables.

Note that other methods for addressing missing records may be utilized, as is well known by those skilled in the art. For example, missing records may be simply dropped. Alternatively, such records may be incorporated with additional information such as extrapolated values form before and/or after the data point, median values or other replacement value.

2. Generation of Imputed Econometric Variables

The foregoing steps (1011-1031) concern cleansing the raw econometric data to create an error detected and error corrected ("cleansed") initial dataset. The cleansed initial dataset created in the foregoing steps can now be used to generate a variety of useful imputed econometric variables (Step 1033). These imputed econometric variables are useful in their own right and may also be output for use in further processing (Step 1035). One particularly useful application of the imputed econometric variables is that they can be input into an optimization engine which collects data input from a variety of sources and processes the data to provide very accurate economic modeling information.

A. Imputed Base Price

Figure 12:
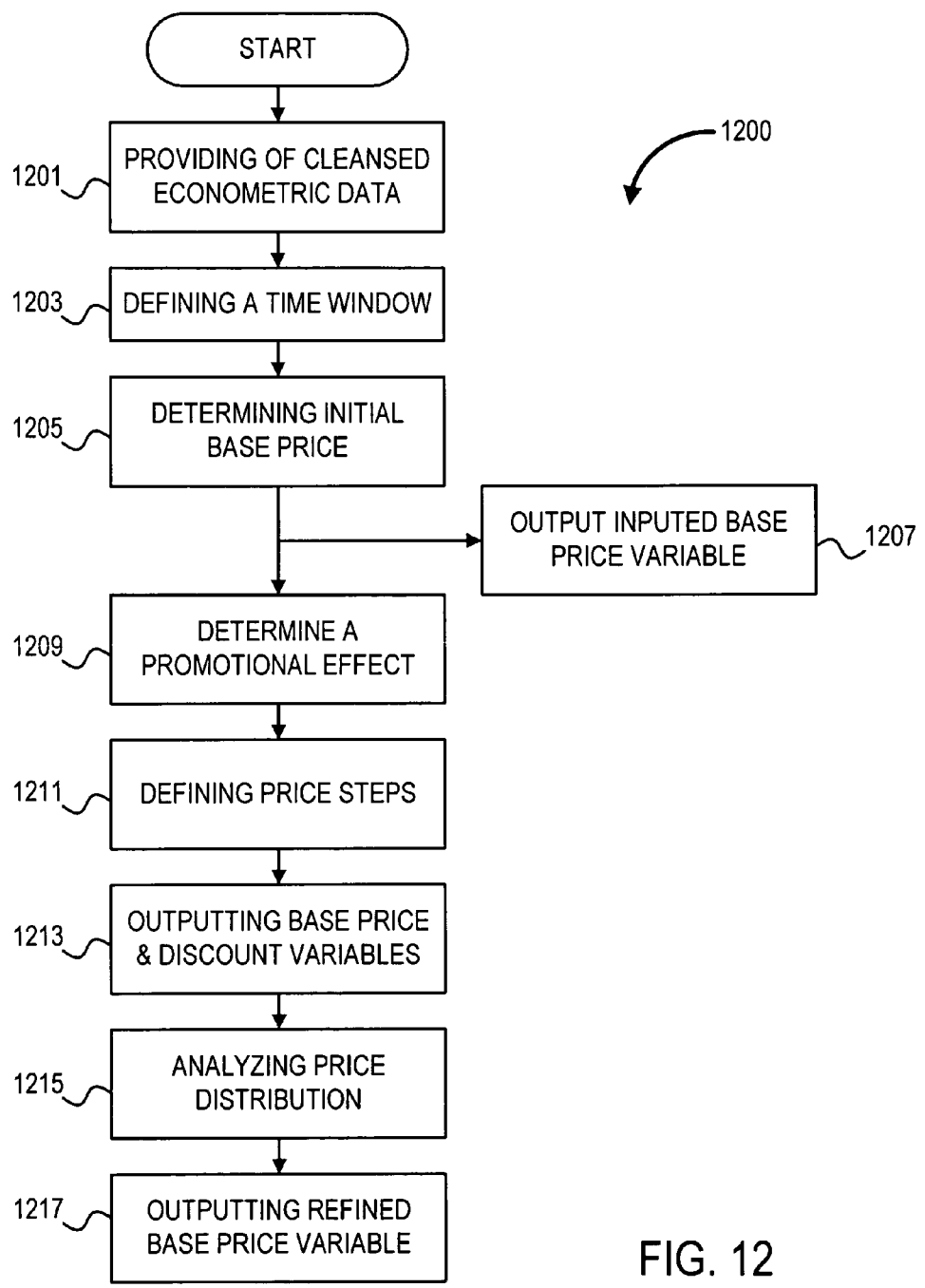
FIG. 12 is a flow chart depicting a process flow by which an imputed base price variable can be generated in accordance with one embodiment of the present invention.

One imputed econometric variable that can be determined using the initial dataset created in accordance with the forgoing, is an imputed base price variable (or base price). FIG. 12 is a flowchart 1200 outlining one embodiment for determining the imputed base price variable. The process begins by providing the process 1200 with a "cleansed" initial dataset (Step 1201), for example, the initial dataset created as described in Steps 1011-1031 of FIG. 10. The initial dataset is examined over a defined time window (Step 1203). Defining a time window (Step 1203) includes choosing an amount of time which frames a selected data point allowing one to look forward and backward in time from the selected data point which lies at the midpoint in the time window. This is done for each data point in the dataset, with the time window being defined for each selected data point. The time frame can be user selected or computer selected.

The initial base price values generated above (Step 1205) provide satisfactory values for the imputed base price variable which may be output (Step 1207) and used for most purposes.

However, optional Steps 1209-1217 describe an approach for generating a more refined imputed base price variable.

In generating a more refined imputed base price variable, the effect of promotional (or discount) pricing is addressed (Steps 1209-1217). This may be calculated by specifying a discount criteria (Step 1209); defining price steps (Step 1211); outputting an imputed base price variable and an imputed discount variable (Step 1213); analyzing the base price distribution (Step 1215); and outputting a refined base price variable (Step 1217).

Data records are evaluated over a series of time periods (e.g., weeks) and evaluated. The point is to identify price records which are discounted below a base price. By identifying these prices and not including them in a calculation of base price, the base price calculation will be more accurate. Therefore, a discount criterion is defined and input as a variable (Step 1209).

Further analysis is used to define base price "steps" (Step 1211). Base price data points are evaluated. Steps are roughly defined such that the base price data points lie within a small percent of distance from the step to which they are associated (e.g., 2%). This can be accomplished using, for example, a simple regression analysis such as is known to those having ordinary skill in the art. By defining the steps, the average value for base price over the step is determined. Also, price data points are averaged to determine the base price of step. Thus, the average of the base prices in a step is treated as the refined base price for that step.

Further refining includes an analysis of the first step. If the first step is short (along the time axis) and considerably lower than the next step, it is assumed that the first step is based on a discounted price point. As such, the value of the next step is treated as the base price for the time period of the first step.

At this point, absolute discount ($\Delta P$) and base price (BP) are used to calculate percent discount ($\Delta P/BP$) for each store product time period.

This base price is subjected to further analysis for accuracy using cross-store checking (Step 1215). This can be accomplished by analyzing the base price data for each product within a given store, and comparing with all other stores. Any outlier store's base price is adjusted for the analyzed product such that it lies closer to an average cross-store percentile for base price over all stores.

Thus, the forgoing process illustrates an embodiment for determining an imputed base price variable.

B. Imputed Relative Price Variable

Figure 13:
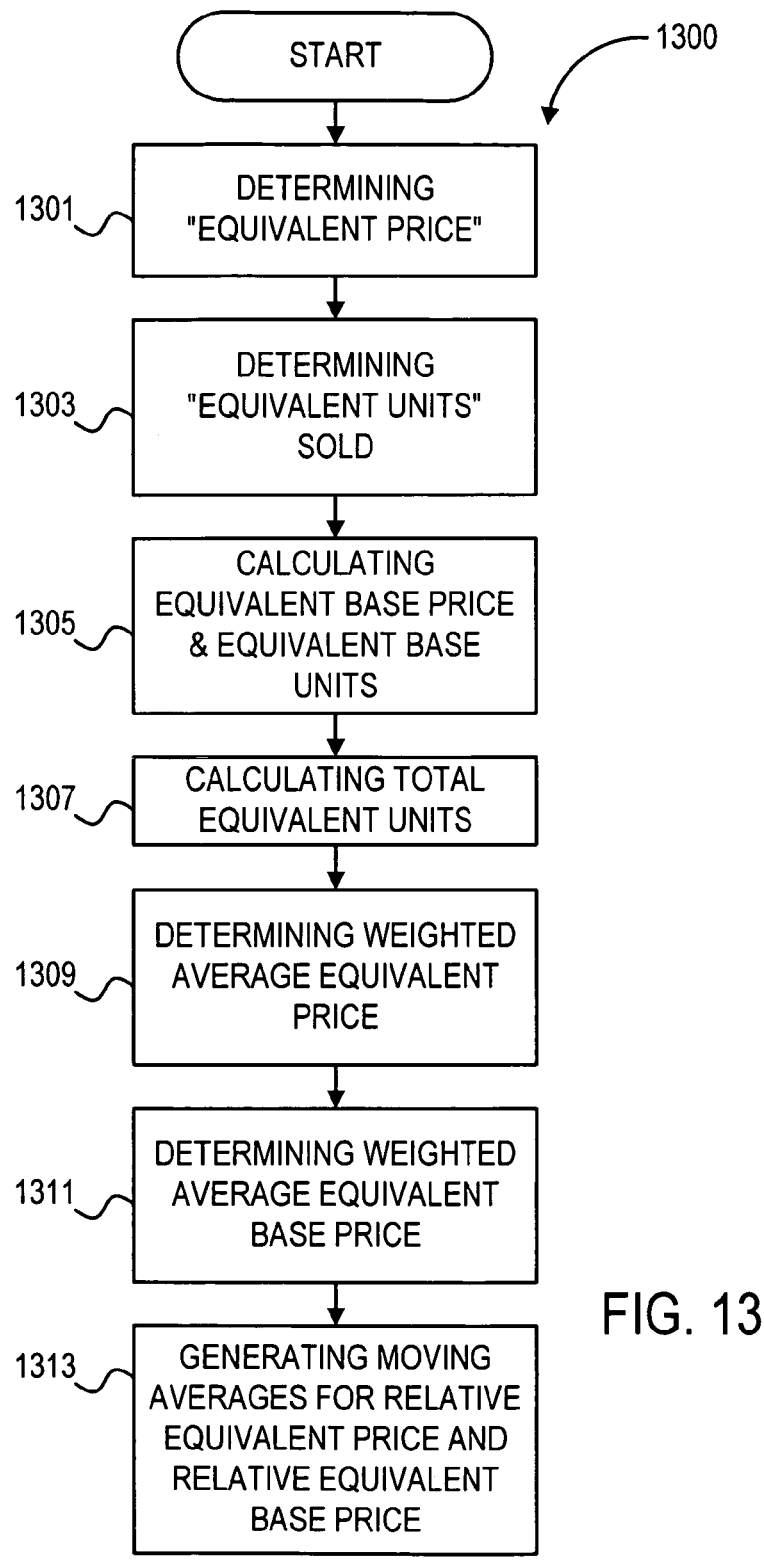
FIG. 13 is a flow chart depicting a process flow by which an imputed relative price variable can be generated in accordance with one embodiment of the present invention.

Reference is now made to the flowchart 1300 of FIG. 13 which illustrates an embodiment for generating relative price variables in accordance with the principles of the present invention. A relative price may be calculated. As disclosed earlier, an equivalizing factor is defined. Using the equivalizing factor, an equivalent price can be calculated (Step 1301). Next equivalent units sold ("units") can be calculated (Step 1303). In a similar vein, equivalent base price and equivalent base units are calculated (Step 1305) using the imputed values for base price (for example, as determined in Steps 1201-1207) and for base units (also referred to as base volume which is determined as disclosed below). For each Store, each demand group, and each date, the total equivalent units is determined (Step 1307). A weighted calculation of relative equivalent price is then made (Step 1309).

For example, such relative price value is determined as follows: equivalent price is divided by a weighted denominator, the weighted denominator is calculated by multiplying equivalent units for each product times the equivalent units sold. For each product, only the values of other products are used in the calculation. This means excluding the product being analyzed. For example, the relative price of A, given three exemplary products A, B and C, is determined as follows:

$$rel_A = \frac{equiv.priceofA}{\left[\begin{array}{c}(equiv.unitsofB)(Equiv.priceofB)+\\(equiv.unitsofC)(equiv.priceofC)\\\hline totalequivalentunits - equivalentunitsofA\end{array}\right]}$$

Also, a weighted average equivalent base price is calculated using the method disclosed hereinabove. The only difference being that instead of using the actual equivalent price, the calculated base price values per equivalent are used (Step 1311). Using the previously disclosed techniques, a moving average is generated for relative actual equivalent price and relative equivalent base price (Step 1313). Thus a variety of imputed relative price variables can be generated (e.g., relative equivalent price, relative equivalent base price. etc.).

C. Imputed Base Volume Variable

Figure 14A:
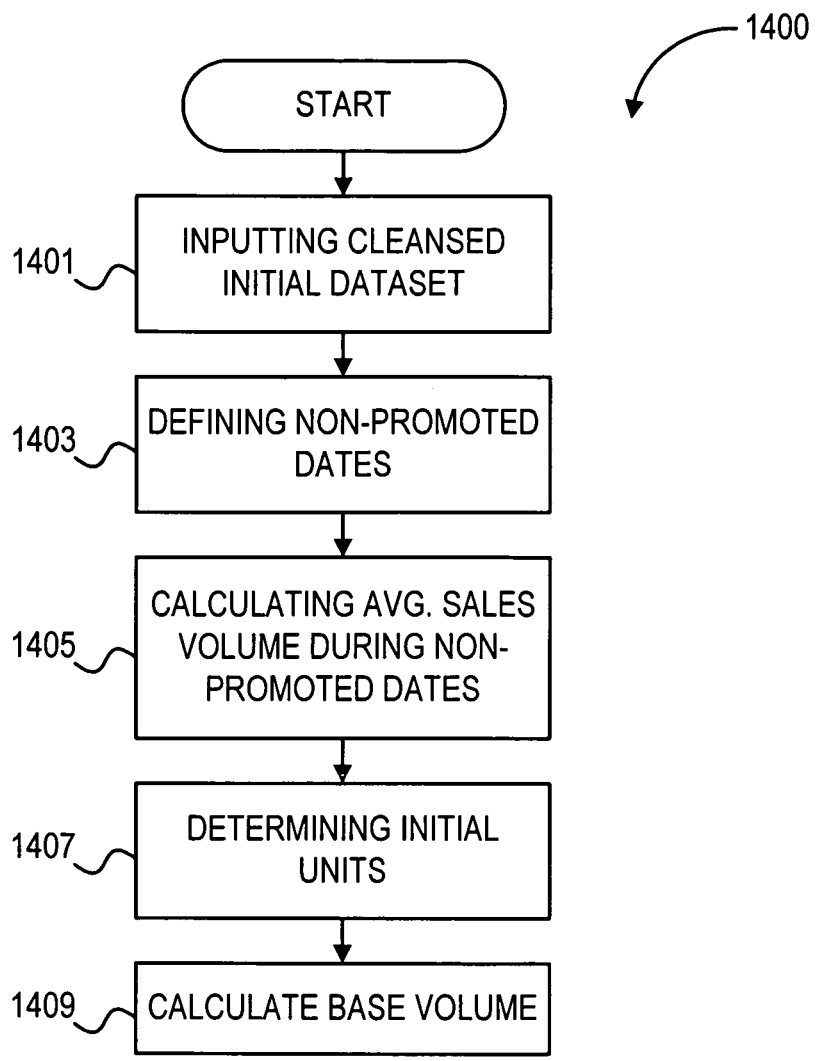
FIG. 14A is a flow chart depicting a process flow by which an imputed base unit sales volume variable can be generated in accordance with one embodiment of the present invention.

A flowchart 1400 shown in FIG. 14A illustrates one embodiment for generating an imputed base volume variable. Base volume refers to the volume of product units sold in the absence of discount pricing or other promotional effects. Base volume is also referred to herein as simply "base units". The determination of base volume begins by receiving the cleansed initial dataset information for each product and store (Step 1401). The initial dataset information is processed to determine "non-promoted dates" (Step 1403), i.e. dates where the products are not significantly price discounted. Using the non-promoted data subset, an average value for "units" and a STD is calculated (i.e., an average value for product unit sales volume for each product during the non-promoted dates is calculated) (Step 1405). This value shall be referred to as the "non-promoted average units". An initial value for base units ("initial base units") is now determined (Step 1407).

Figure 14B:
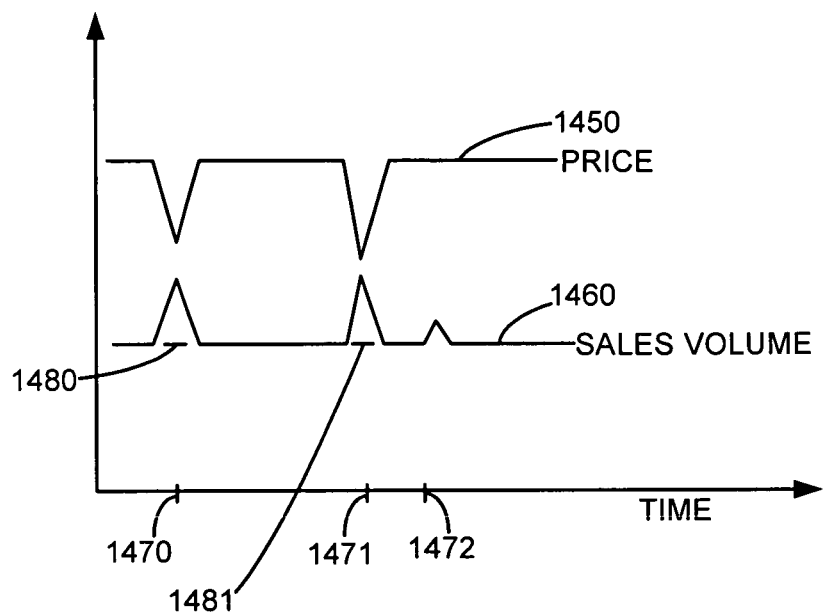
FIG. 14B is a diagram used to illustrate the comparative effects of sales volume increase and price discounts.

This principle can be more readily understood with reference to FIG. 14B. The price behavior 1450 can be compared with sales behavior 1460. Typically, when the price drops below a certain level, sales volume increases. This can be seen at time periods 1470, 1471. In such a case, the actual units sold (more than usual) are not included in a base volume determination. Rather, those records are replaced with the average volume value for the non-promoted dates (the non-promoted average unit value, shown with the dotted lines 1480, 1481). However, where a sales volume increases during a period of negligible discount (e.g., less than 2%), such as shown for time period 1472, the actual units sold (actual sales volume) are used in the calculation of base volume. However, if the records show a sales volume increase 1472 which is too large (e.g., greater than 1.5 standard deviations from the non-promoted average unit value), it is assumed that some other factor besides price is influencing unit volume and the actual unit value is not used for initial base units but is replaced by the non-promoted average unit value.

A calculated base volume value is now determined (Step 1409). This is accomplished by defining a time window. For each store and product, the average value of "initial base units" is calculated for each time window. This value is referred to as "average base units". This value is calculated for a series of time windows to generate a moving average of "average base units". This moving average of the average base units over the modeled time interval is defined as the "base volume variable".

D. Supplementary Error Detection and Correction

Figure 15A:
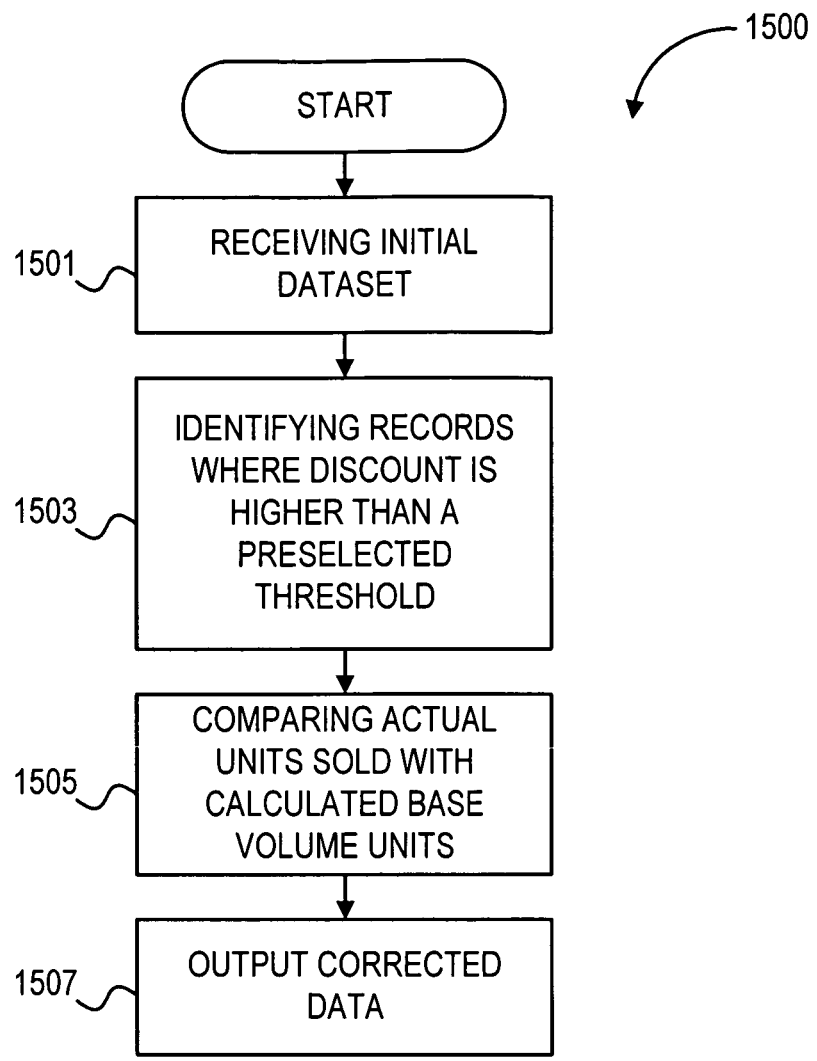
FIG. 15A is a flow chart depicting a process flow by which supplementary error detection and correction in accordance with an embodiment of the present invention.

Based on previously determined discount information, supplementary error detection and correction may be used to correct price outliers. A flowchart 1500 illustrated in FIG. 15A shows one embodiment for accomplishing such supplementary error detection and correction. Such correction begins by receiving the cleansed initial dataset information for each product and store (Step 1501). In addition, the previously calculated discount information is also input, or alternatively, the discount information (e.g., $\Delta P/BP$) can be calculated as needed. The initial dataset and discount information is processed to identify discounts higher than a preselected threshold (e.g., 60% discount) (Step 1503). For those time periods (e.g., weeks) having price discounts higher than the preselected threshold (e.g., greater than 60%), a comparison of actual units sold to calculated base volume units (as calculated above) is made (Step 1505) and corrected data is output (Step 1507).

Figure 15B:
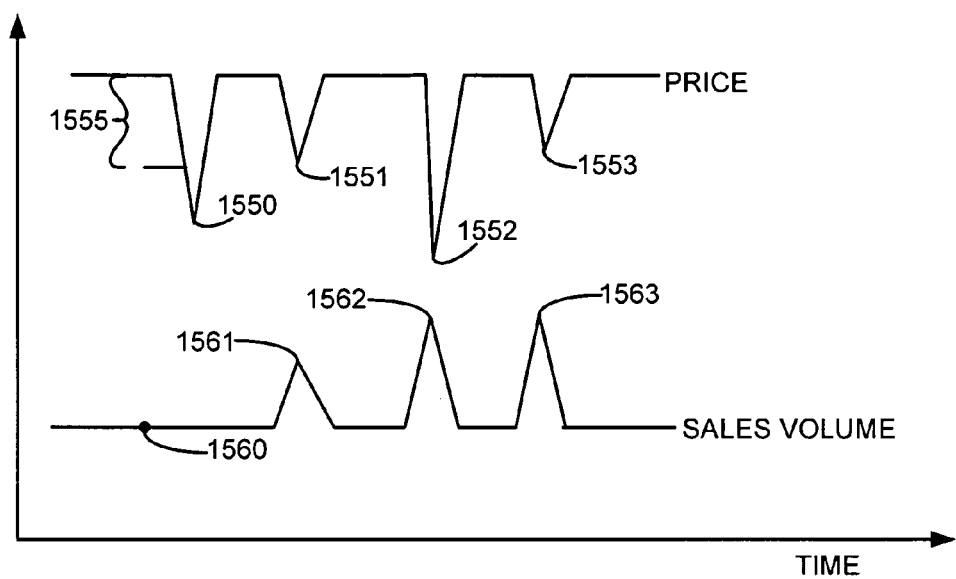
FIG. 15B is a diagram used to illustrate the comparative effects of sales volume increase and price discounts.
Figure 16:
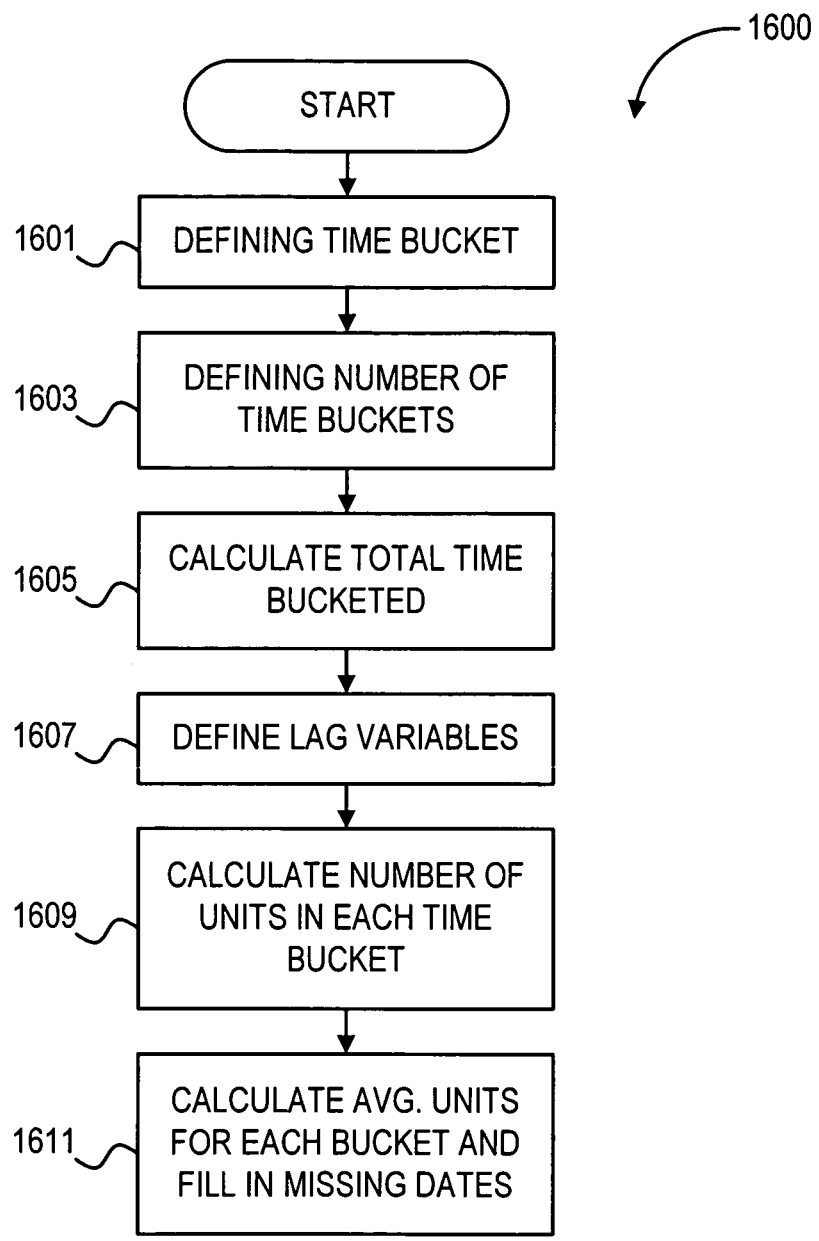
FIG. 16 is a flow chart depicting a process flow by which an imputed stockpiling variable can be generated in accordance with an embodiment of the present invention.

The concepts are similar to that illustrated in FIG. 14B and may be more easily illustrated with reference to FIG. 15B. The principles of this aspect of the present invention are directed toward finding unexplained price aberrations. For example, referring to FIG. 15B, price discounts are depicted at data points 1550, 1551, 1552, and 1553. Also, corresponding sales increases are depicted by at data points 1561, 1562, and 1563. The data point 1550 has a discount greater than the threshold 1555 (e.g., 60%). So an analysis is made of data point 1550.

E. Determining Imputed Variables which Correct for the Effect of Consumer Stockpiling With reference to FIG. 16, a flowchart 1600 illustrating a method embodiment for generating stockpiling variables is depicted. The pictured embodiment 1600 begins by defining the size of a "time bucket" (m), for example, the size (m) of the bucket can be measured in days (Step 1601). Additionally, the number ($\tau$) of time buckets to be used is also defined (Step 1603). The total amount of time "bucketed" (m×$\tau$) is calculated (Step 1605).

"Lag" variables which define the number of product units sold ("units") in the time leading up to the analyzed date are defined (Step 1607). Then the total number of product units sold is calculated for each defined time bucket (Step 1609). Correction can be made at the "front end" of the modeled time interval.

If working near the front end of a dataset, units from previous weeks cannot always be defined and in their place an averaged value for bucket sum can be used (Step 1611). The idea is to detect and integrate the effects of consumer stockpiling on into a predictive sales model.

F. Day of the Week Analysis

Figure 17:
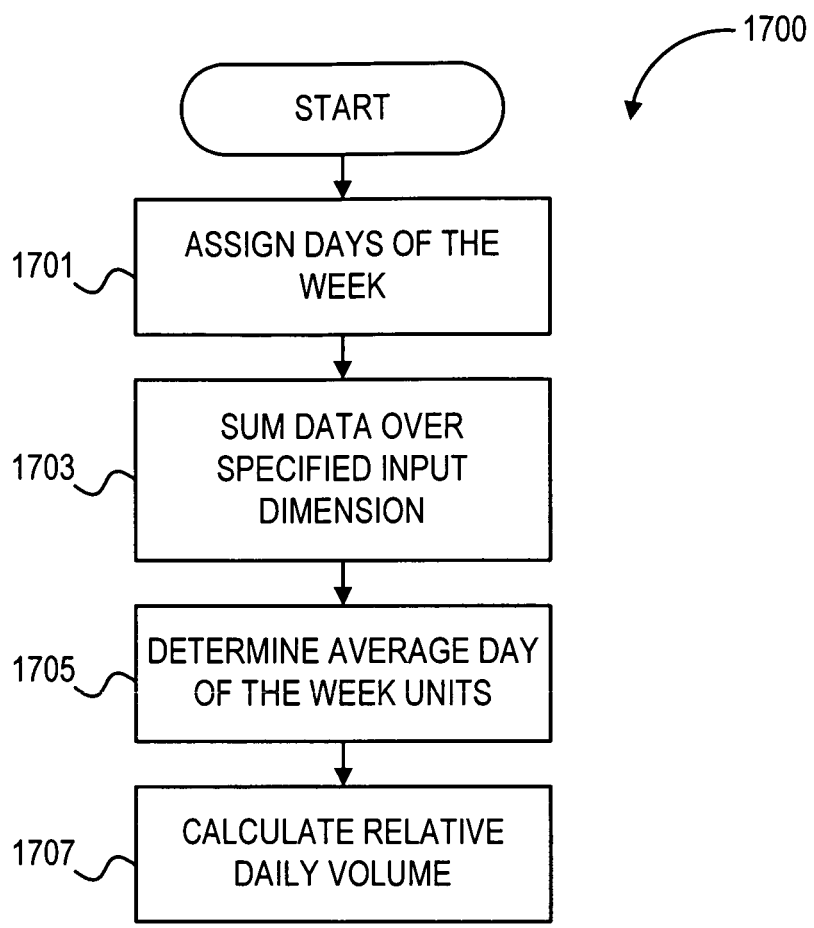
FIG. 17 is a flow chart depicting a process flow by which an imputed day-of-week variable can be generated in accordance with an embodiment of the present invention.

With reference to FIG. 17, a flowchart 1700 illustrating one embodiment for determining a Day of the Week variable is shown. It is necessary to have data on a daily basis for a determination of Day of the Week effects. In accordance with the principles of the present invention, the embodiment begins by assigning the days of the week numerical values (Step 1701). Once categorized by day of the week, the product units (sold) are summed for a specified dimension or set of dimensions. Dimension as used herein means a specified input variable including, but not limited to, Product, Brand, Demand Group, Store, Region, Store Format, and other input variable which may yield useful information (Step 1703). For each Day of Week and each dimension specified, the average units (sold) are determined (Step 1705). For each date, a "relative daily volume" variable is also determined (Step 1707). This information may prove valuable to a client merchant and can comprise an input variable for other econometric models.

G. Imputed Seasonality Variable Generation

Figure 18:
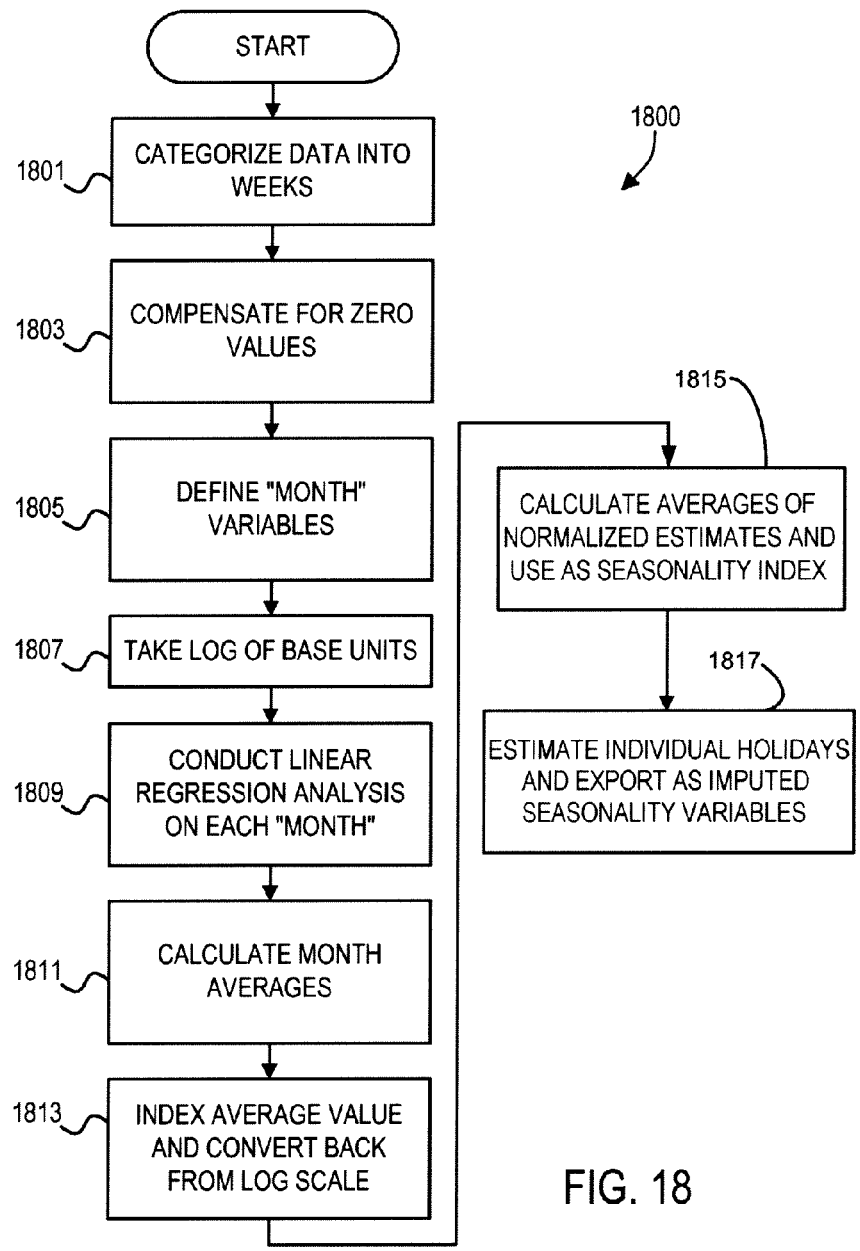
FIG. 18 is a flow chart depicting a process flow by which an imputed seasonality variable can be generated in accordance with an embodiment of the present invention.

Another useful imputed variable is an imputed seasonality variable for determining seasonal variations in sales volume. Referring to FIG. 18, a flowchart 1800 illustrating one embodiment in accordance with the present invention for determining an imputed seasonality variable is shown. The process begins with categorizing the data into weekly data records, if necessary (Step 1801). Zero values and missing records are then compensated for (Step 1803). "Month" variables are then defined (Step 1805). A logarithm of base units is then taken (Step 1807). Linear regressions are performed on each "Month" (Step 1809). "Months" are averaged over a specified dimension (Step 1811). Indexes are averaged and converted back from log scale to original scale (Step 1813). The average of normalized estimates are calculated and used as Seasonality index (Step 1815). Individual holidays are estimated and exported as imputed seasonality variables (Step 1817).

H. Imputed Promotional Variable

Figure 19:
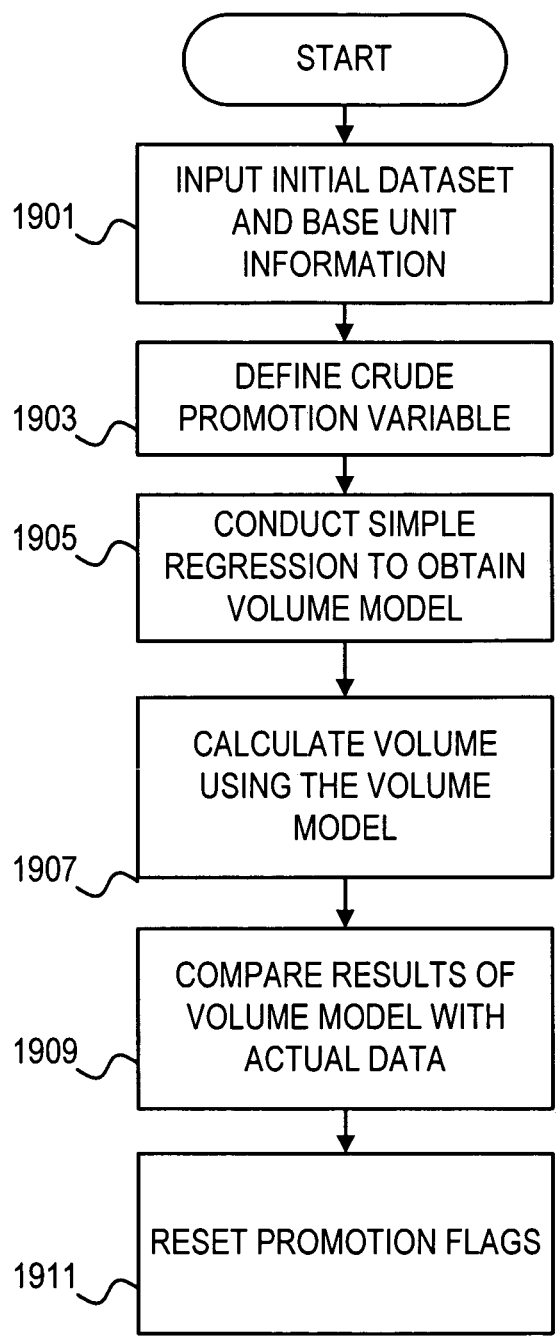
FIG. 19 is a flow chart depicting a process flow by which an imputed promotional effects variable can be generated in accordance with an embodiment of the present invention.

Another useful variable is a variable which can predict promotional effects. FIG. 19 provides a flowchart illustrating an embodiment enabling the generation of imputed promotional variables in accordance with the principles of the present invention. Such a variable can be imputed using actual pricing information, actual product unit sales data, and calculated value for average base units (as calculated above). This leads to a calculation of an imputed promotional variable which takes into consideration the entire range of promotional effects.

Referring back to FIG. 19, the process begins by inputting the cleansed initial dataset and the calculated average base units information (Step 1901). A crude promotional variable is then determined (Step 1903). Such a crude promotional variable can be defined using promotion flags. A simple regression analysis, as is known to those having ordinary skill in the art, (e.g., a mixed effects regression) is run on sales volume to obtain a model for predicting sales volume (Step 1905). Using the model a sample calculation of sales volume is performed (Step 1907). The results of the model are compared with the actual sales data to further refine the promotion flags (Step 1909). If the sales volume is underpredicted (by the model) by greater than some selected percentage (e.g., 30-50%) the promotion flag may be set to reflect the effects of a probable non-discount promotional effect. Since the remaining modeled results more closely approximate actual sales behavior, the promotion flags for those results are not reset (Step 1911). The newly defined promotion flags are incorporated into a new model for defining the imputed promotional variable.

I. Imputed Cross-Elasticity Variable

Figure 20:
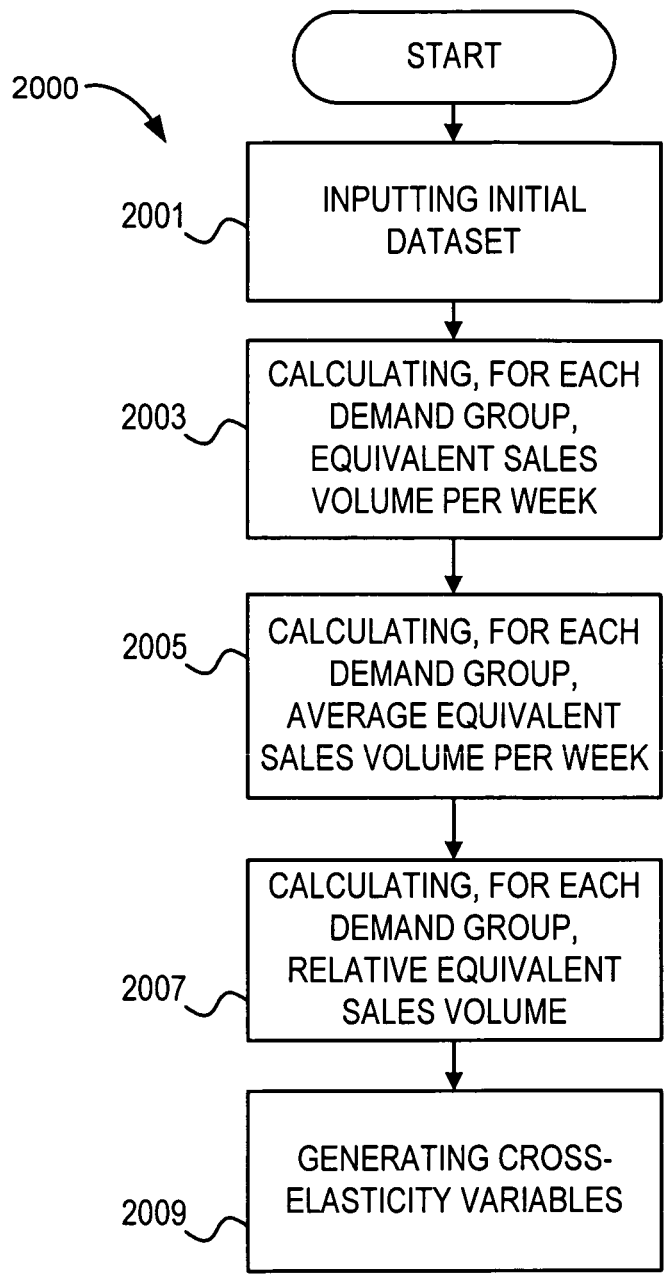
FIG. 20 is a flow chart depicting a process flow by which an imputed cross-elasticity variable can be generated in accordance with some embodiment of the present invention.

Another useful variable is a cross-elasticity variable. FIG. 20 depicts a flowchart 2000 which illustrates the generation of cross-elasticity variables in accordance with the principles of the present invention. The generation of an imputed cross-elasticity variable allows the analysis of the effects of a demand group on other demand groups within the same category. Here, a category describes a group of related demand groups which encompass highly substitutable products and complementary products. Typical examples of categories are, among many others, Italian foods, breakfast foods, or soft drinks.

The initial dataset information is input into the system (Step 2001). For each demand group, the total equivalent sales volume for each store is calculated for each time period (for purposes of this illustration the time period is a week) during the modeled time interval (Step 2003). For each week and each demand group, the average total equivalent sales volume for each store is calculated for each week over the modeled time interval (Step 2005). For each demand group the relative equivalent sales volume for each store is calculated for each week (Step 2007). The relative demand group equivalent sales volume for the other demand groups is quantified and treated as a variable in the calculation of sales volume of the first demand group, thereby generating cross-elasticity variables (Step 2009).

The calculated imputed variables and data are outputted from the Imputed Variable Generator 304 to the Coefficient Estimator 308. Some of the imputed variables may also be provided to the Financial Model Engine 108.

B. Coefficient Estimator

The Coefficient Estimator 308 uses the imputed variables and data to estimate coefficients, which may be used in an equation to predict demand. In a preferred embodiment of the invention, sales for a demand group (S) is calculated and a market share (F) for a particular product is calculated, so that demand (D) for a particular product is estimated by $D=S \cdot F$. A demand group is defined as a collection of highly substitutable products. In the preferred embodiments, the imputed variables and equations for sales (S) of a demand group and market share (F) are as follows:

1. Modeling Framework

The econometric modeling engine uses one or more of statistical techniques, including, but not limited to, linear and non-linear regressions, hierarchical regressions, mixed-effect models, Bayesian techniques incorporating priors, and machine learning techniques. Mixed-effect models are more robust with regards to missing or insufficient data. Further, mixed-effect models allow for a framework of sharing information across various subjects in the model, enabling better estimates. Bayesian techniques with prior information can incorporate all the features of the mixed effect models and, in addition, also enable for guiding the allowable values of the coefficients based upon existing information.

III. Financial Model Engine

The Financial Model Engine 108 receives data 132 from the Stores 124 and may receive imputed variables (such as baseline sales and baseline prices) and data from the Econometric Engine 104 to calculate fixed and variable costs for the sale of each item.

Figure 5:
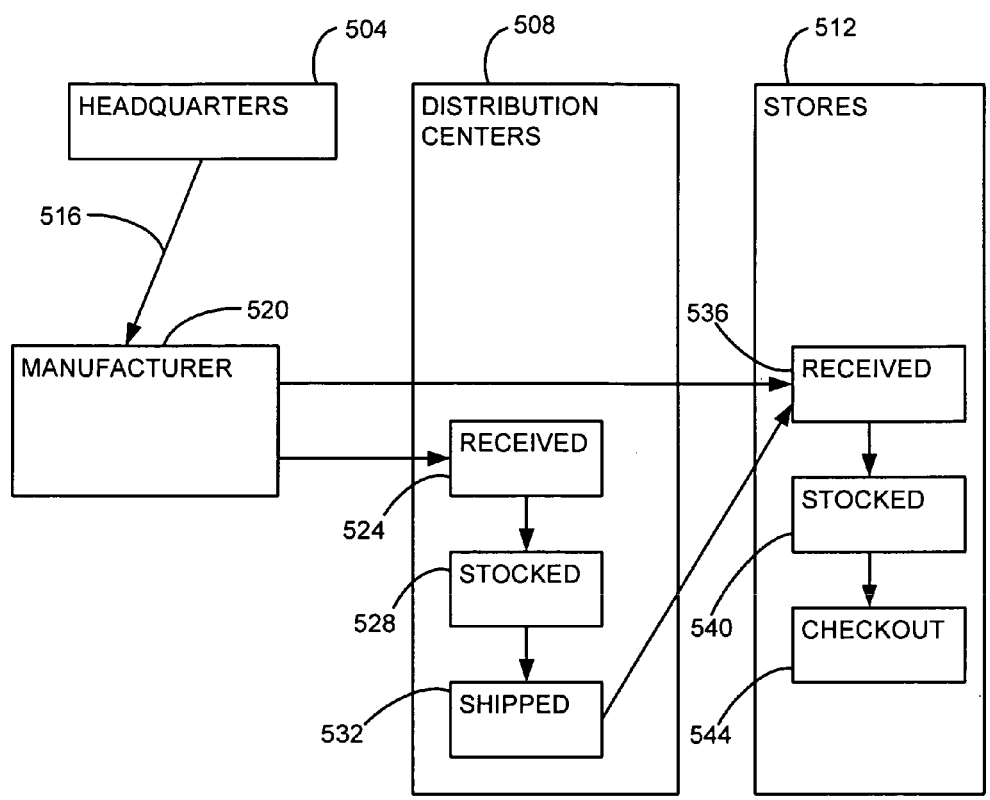
FIG. 5 is a block diagram to illustrate some of the transaction costs that occur in retail businesses of a chain of stores.
Figure 6:
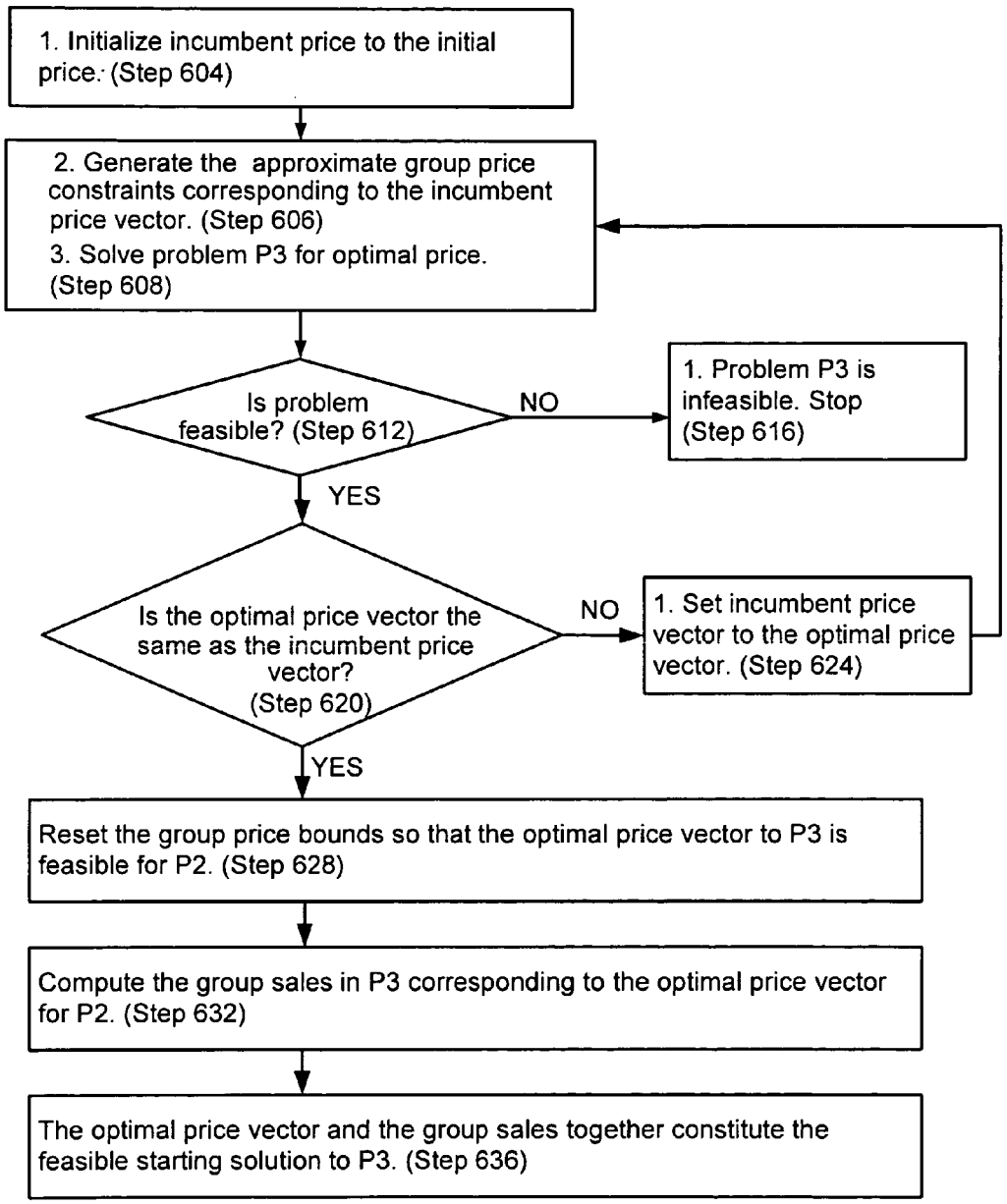
FIG. 6 is a flow chart of some embodiment of the invention for providing an initial feasible solution.

To facilitate understanding, FIG. 5 is an exemplary block diagram to illustrate some of the transaction costs that occur in retail businesses of a chain of stores. The chain of stores may have a headquarters 504, distribution centers 508, and stores 512. The headquarters 504 may place an order 516 to a manufacturer 520 for goods supplied by the manufacturer 520, which generates an order placement cost. The manufacturer 520 may ship the goods to one of the distribution centers 508. The receiving of the goods by the distribution center 508 generates a receiving cost 524, a cost for stocking the goods 528, and a cost for shipping the goods 532 to one of the stores 512. The store 512 receives the goods from one of the distribution centers 508 or from the manufacturer 520, which generates a receiving cost 536 and a cost for stocking the goods 540. When a customer purchases the item, the stores 512 incur a check-out cost 544.

The Financial Model Engine 108 should be flexible enough to provide a cost model for these different procedures. These different costs may have variable cost components where the cost of an item is a function of the amount of sales of the item and fixed cost components where the cost of an item is not a function of the amount of sales of the item. Financial Model Engine 108, thus, may generate a model that accounts for procurement costs in addition to the various costs associated with conducting business.

IV. Optimization Engine and Support Tool

Figure 4:
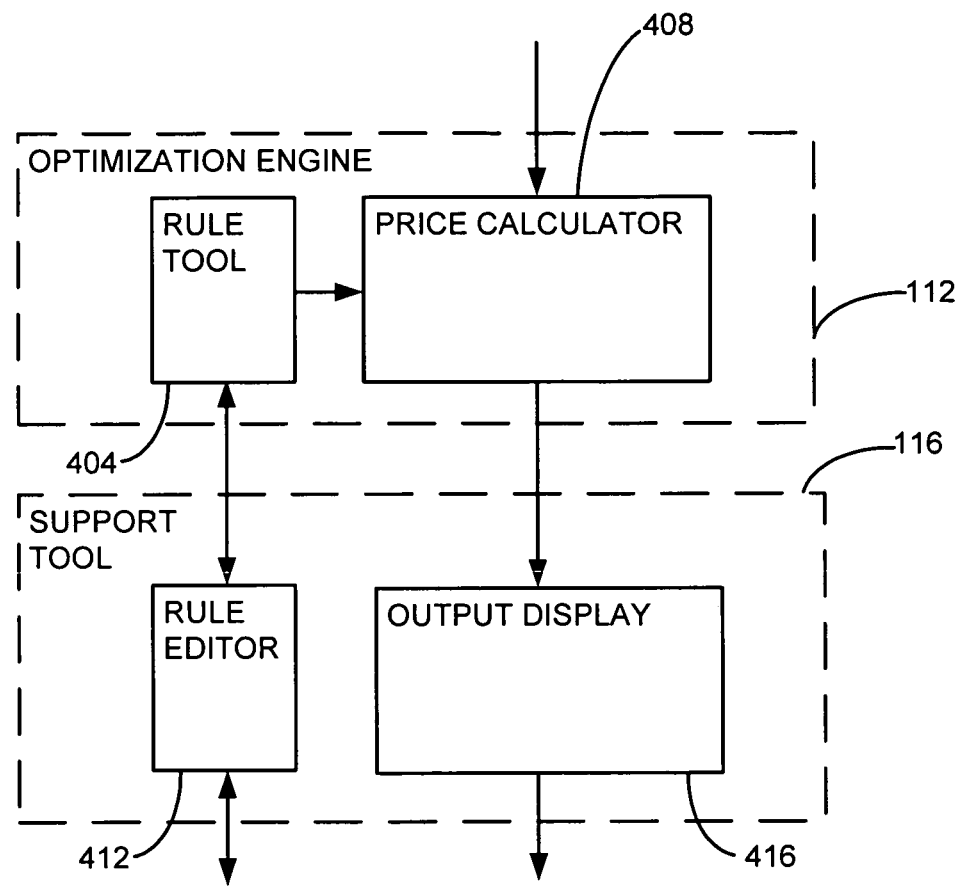
FIG. 4 is a more detailed schematic view of the optimization engine and support tool.

FIG. 4 is a more detailed schematic view of the Optimization Engine 112 and the Support Tool 116. The Optimization Engine 112 comprises a rule tool 404 and a price calculator 408. The Support Tool 116 comprises a rule editor 412 and an output display 416.

In operation, the client (stores 124) may access the rule editor 412 of the Support Tool 116 and provides client defined rule parameters (step 228). If a client does not set a parameter for a particular rule, a default value is used. Some of the rule parameters set by the client may be constraints to the overall weighted price advance or decline, branding price rules, size pricing rules, unit pricing rules, line pricing rules, and cluster pricing rules. The client defined parameters for these rules are provided to the rule tool 404 of the Optimization Engine 112 from the rule editor 412 of the Support Tool 116. Within the rule tool 404, there may be other rules, which are not client defined, such as a group sales equation rule. The rule parameters are outputted from the rule tool 404 to the price calculator 408. The demand coefficients 128 and cost data 136 are also inputted into the price calculator 408. The client may also provide to the price calculator 408 through the Support Tool 116 a desired optimization scenario rules. Some examples of scenarios may be to optimize prices to provide the optimum profit, set one promotional price and the optimization of all remaining prices to optimize profit, or optimized prices to provide a specified volume of sales for a designated product and to optimize price. The price calculator 408 then calculates optimized prices. The price calculator 408 outputs the optimized prices to the output display 416 of the Support Tool 116, which allows the Stores 124 to receive the optimized pricing (step 232).

V. Customer Retention Engine

A. System Overview

Figure 21:
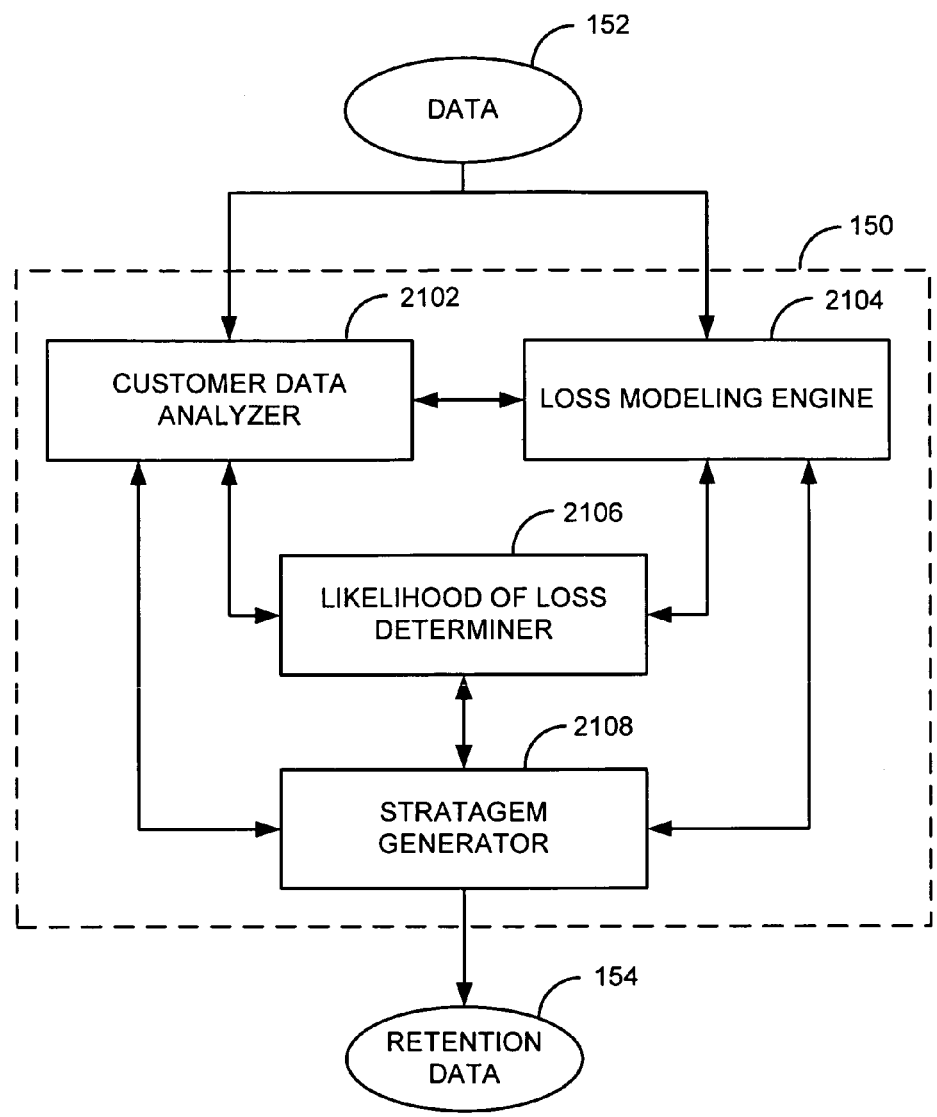
FIG. 21 is a more detailed schematic view of the customer retention engine.

FIG. 21 is a more detailed schematic view of the Customer Retention Engine 150. The Customer Retention Engine 150 may include a Customer Data Analyzer 2102, a Loss Modeling Engine 2104, a Likelihood of Loss Determiner 2106 and a Stratagem Generator 2108. The Customer Data 152 may be provided from the Stores 124 to the Customer Data Analyzer 2102 and Loss Modeling Engine 2104. The Customer Data Analyzer 2102 may analyze the Customer Data 152 to generate a usable data set. This dataset may then be sent to the Likelihood of Loss Determiner 2106 and Stratagem Generator 2108 to generate Retention Data 154.

The Loss Modeling Engine 2104 may receive raw Customer Data 152 and processed data from the Customer Data Analyzer 2102 to tune the loss model. A figure of merit function, or similar method, may be utilized to tune the loss model. The tuned model may be provided to the Likelihood of Loss Determiner 2106 and Stratagem Generator 2108 to generate the Retention Data 154.

The Likelihood of Loss Determiner 2106 compares the dataset provided by the Customer Data Analyzer 2102 to the loss model from the Loss Modeling Engine 2104 to generate data as to the customer's likelihood of loss. This statistical attrition value may include a raw loss likelihood information, as well as customer specific "loss valuation". Such a loss valuation may include some matrix of customer attrition and consumer value. Such a loss valuation may function as customer "credit score" and may be useful for determining level of customer service and retention promotions that is economical to be provided to the customer.

The raw loss likelihood statistics and the customer "loss valuation" may be provided to the Stratagem Generator 2108 where promotions, rule changes and individualized outreach plans may be formulated. Collectively, such retention measures may be referred to as a retention stratagem. The retention stratagem and any loss data may be compiled and outputted as the Retention Data 154.

Where the Customer Retention Engine 150 is included in an integrated optimization system, the Retention Data 154 may be consumed by the optimization engine in the generation of optimal pricing. Such pricing and promotions may take into account attrition rates. Thus, for example, the optimization may maximize profit, or other goal, while maintaining some attrition rate. This could easily be extended to balance the short term goals of category or store level financial metrics (revenues, margins, etc.) against longer term customer-centric goals such as life-time value, probability of attrition, etc.

Additionally, the Retention Data 154 may be utilized by business managers and investors to dictate business decisions.

Figure 22:
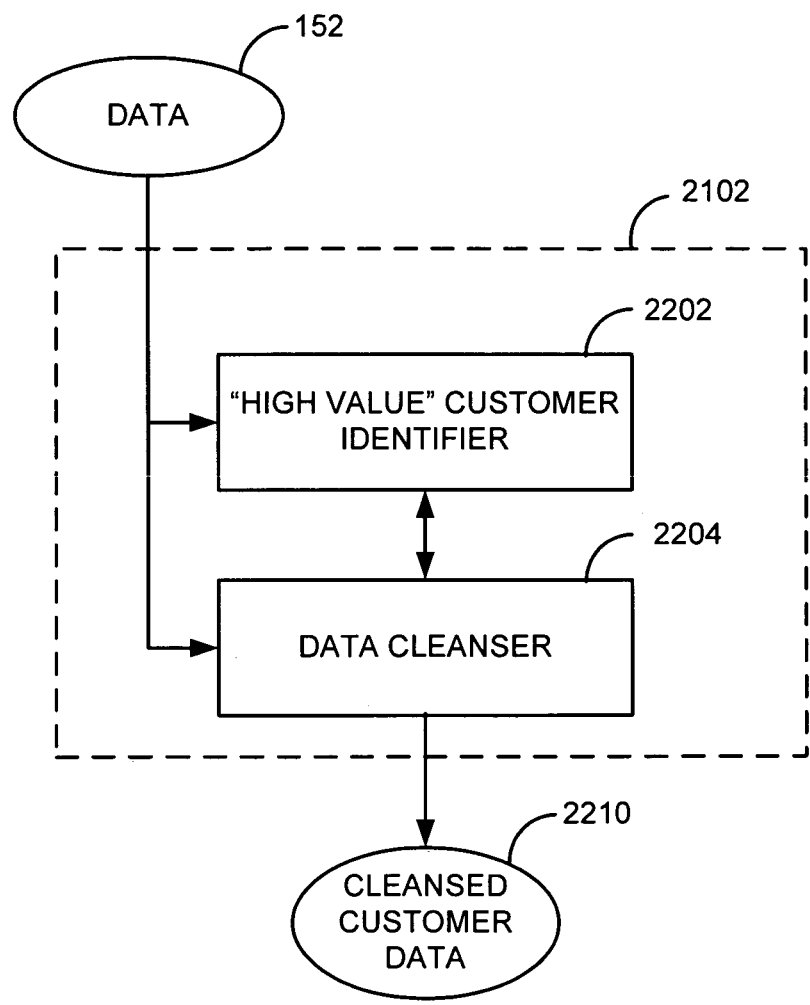
FIG. 22 is a more detailed schematic view of the customer data analyzer of the customer retention engine.

FIG. 22 is a more detailed schematic view of the Customer Data Analyzer 2102 of the Customer Retention Engine 150. The Customer Data Analyzer 2102 may include a "High Value" Customer Identifier 2202 and a Data Cleanser 2204, each coupled to one another. The Customer Data 152 may be received by the "High Value" Customer Identifier 2202 where "high value customers" are identified.

"High value", in some embodiments, may be defined to include a customer who spends above a particular threshold on a regular basis. Alternatively, a high value customer may include customers who generate a particular profit for the company, fit a particular profile, or are within the top quantiles (e.g., 5%, 10%, etc.) of the company's consumers. It should be noted that while the discussion contained herein primarily revolves around customer "value" as being related to that customer's 'economic value', additional criteria may be utilized such as environmentally conscious customers, customers with growing families, or any additional criteria.

Prior to determining "high value" customers, the initial Customer Data 152 may be conditioned to resolve customer identity. In general, Customer Data 152 includes listings of transaction logs referenced by one or more customer identifiers. Such identifiers may include a loyalty card or other loyalty program. Additionally, in some embodiments, credit card, check or other payment information may be utilized to determine customer identity. In yet other embodiments, statistical information as to purchasing habits and needs may be utilized to disambiguate transactions entries and identify customers. This may be particularly effective when the business involves a relatively small number of customers, and such purchase history may accurately identify the customer to which each transaction belongs. Likewise, it is within the scope of the invention to identify customers by facial recognition software, biometric data, as well as state and private registries.

Additionally, loyalty card information, or other identifier information may be linked between individuals known to purchase goods for consumption in one household. Thus, if family members shop separately, the data regarding spend habits may be aggregated among all family members to generate a household dataset.

Properly identifying the customer each transaction belongs to is integral to the proper tuning of the loss model, as well as generating accurate likelihood of loss measures. Thus, one, more, or all of the above methods of customer identification may be utilized by the Customer Retention Engine 150 to disambiguate transaction logs.

Additionally, in the case of conflicts between identifiers, each identifier may be given a priority ranking to resolve such discrepancies. For example, if a particular transaction includes payment by credit card, as well as an association with a loyalty card, the payment data may take priority in the case that the identifiers conflict. Such priority ranking may be configured by the store 124 using the Customer Retention Engine 150, or may be preconfigured based upon the likelihood of accuracy. In general, payment identity data is the most accurate of identifiers. Loyalty programs may be relatively accurate, but not as accurate as payment identifiers. Statistical purchasing analysis may vary in accuracy dependent upon customer variety, wealth of historical data, and the existence of tell tale purchase habits.

The Data Cleanser 2204 may then cleanse the Customer Data 152 in a manner similar to the data cleansing outlined above. Customer identification and determining of 'high value' customers may be utilized to limit the transaction data entries that require cleansing. For example, if retention analysis and measures for retention are only desired for customers deemed "high value", only data belonging to these "high value" customers needs to be cleansed and subsequently analyzed. Thus, unnecessary data need not be processed, thereby enhancing retention analysis speed and efficiency.

The Data Cleanser 2204 may generate Cleansed Customer Data 2210 for subsequent consumption by the Loss Modeling Engine 2104, the Likelihood of Loss Determiner 2106 and the Stratagem Generator 2108.

Figure 23:
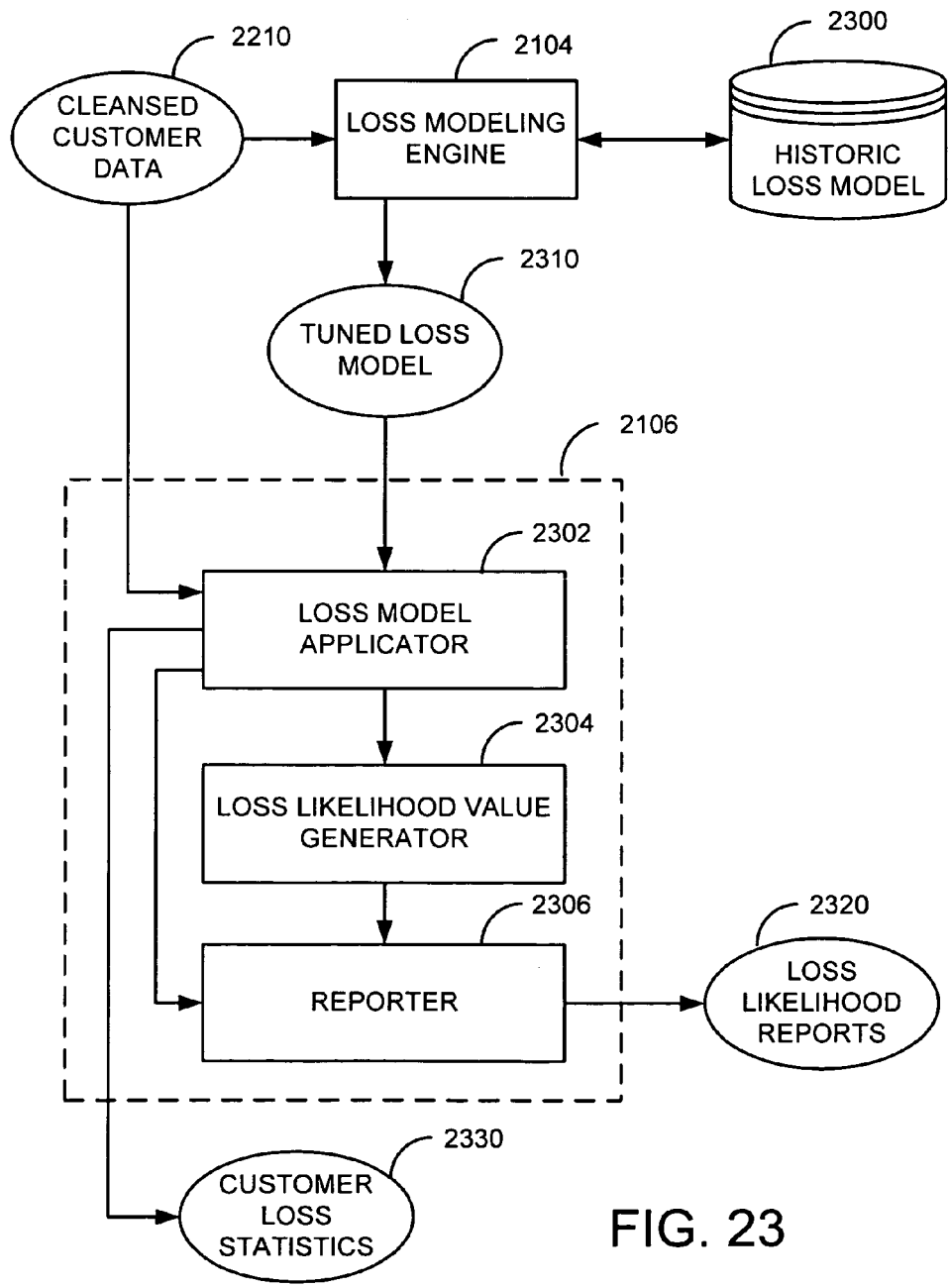
FIG. 23 is a more detailed schematic view of the likelihood of loss determiner of the customer retention engine.

FIG. 23 is a more detailed schematic view of the Likelihood of Loss Determiner 2106 of the Customer Retention Engine 150. Cleansed Customer Data 2210 from the Data Cleanser 2204 may be provided to the Loss Model Applicator 2302 and the Loss Model Engine 2104. The Loss Model Engine 2104 also may access a Database of Historical Loss Models 2300. The Loss Model Engine 2104 may then generate a Tuned Loss Model 2310, which may then be supplied to the Loss Model Applicator 2302.

In the Loss Model Applicator 2302 the Cleansed Customer Data 2210 may be applied to the Tuned Loss Model 2310 to generate statistical likelihood of loss of any particular customer. The detailed (original) statistical data may be exported as Customer Loss Statistics 2330. Additionally such statistical data may be provided to the Loss Likelihood Value Generator 2304 where the loss value, or Loss Likelihood Value (LLV), for any particular customer may be generated. The loss value may include some weighted measure of the customer's 'value' to the company references by that customer's likelihood of loss. Thus, the loss value may indicate the relative effort the company may economically expend in preventing loss of the particular customer. In some embodiments, more complicated loss values may be computed. For example, 'low value' customers that are very likely to leave may have a low loss value. Whereas, attrition-risk high value customers is low, they might have a high loss value prompting different corrective actions. Thus, the loss value may provide a quick measure of the customer's "service worthiness" similar to how credit scores are currently utilized to gauge "credit worthiness". Again, the terms utilized in the present invention include an undercurrent of quality or merit. These terms are intended to apply to an individual customer's expected contribution to a retailer's ongoing or long-term financial metrics.

Additional examples of loss value include: 1) time-discounted value of all the future lost purchases, 2) a weighted function between the expense of retention and the loss revenue, 3) a threshold on the deviation from the desired customer demographic (e.g., if a retailer desires 40%-60% male customers and instead it drops to 30% male customers).

The loss value may be provided from the Loss Likelihood Value Generator 2304 to the Reporter 2306 where the Reporter 2306 may generate one or more Loss Likelihood Reports 2320. These reports may be simple datasets of customer identifiers coupled to the loss value for that customer. Alternatively, the reports may provide summary graphs and statistics as to the general health of the company's customer base, losses expected in the near future and costs of retention. Such reports may be helpful for business planning and investor decisions.

Figure 24:
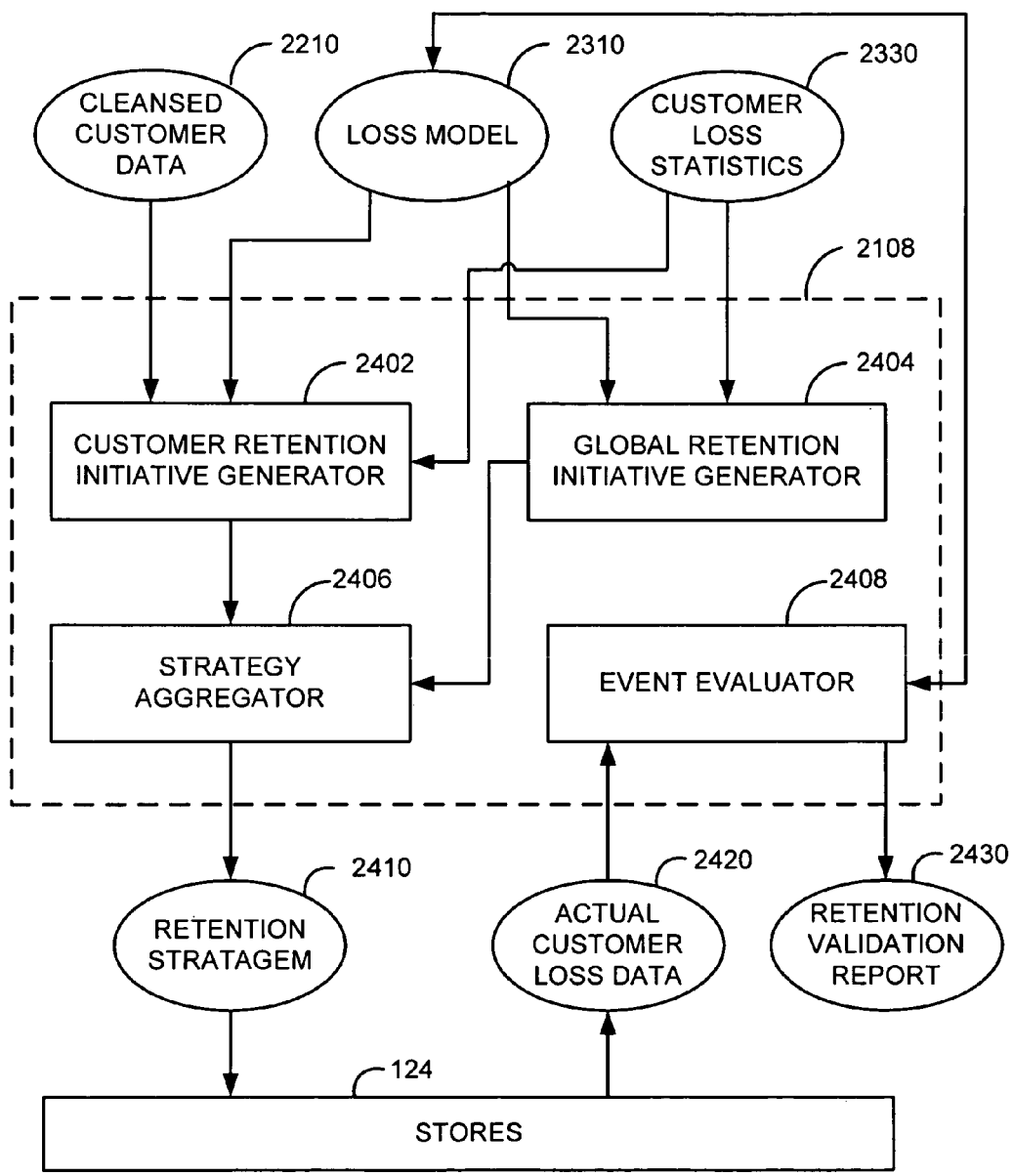
FIG. 24 is a more detailed schematic view of the stratagem generator of the customer retention engine.

FIG. 24 is a more detailed schematic view of the Stratagem Generator 2108 of the Customer Retention Engine 150. The Stratagem Generator 2108 may include a Customer Retention Initiative Generator 2402, a Global Retention Initiative Generator 2404 and a Strategy Integrator 2406. The Customer Retention Initiative Generator 2402 may receive the Loss Model 2310, Customer Loss Statistics 2330 and Cleansed Customer Data 2210 in order to generate customer retention measures or initiatives. Such measures may include, but are not limited to, temporary pricing reductions, mailers, coupons and individualized ads. These initiatives may be customer specific, such as a mailing of high value individualized coupons to the customer in danger of leaving.

The Global Retention Initiative Generator 2404 may receive the Loss Model 2310 and Customer Loss Statistics 2330 to generate global retention measures. Such measures may identify trends that lead to customer loss and correct for such trends. For example, general sales on particular items may increase general retention of customers. Likewise, a dated store with a newer competitor may result in a remodeling measure to prevent customer attrition.

The global retention measures and customer specific retention measures may be aggregated and integrated into a coherent retention strategy at the Strategy Integrator 2406. A Retention Stratagem 2410 may be outputted. This Retention Stratagem 2410 may then be sent to Stores 124 for implementation. The Stores 124 may then produce Customer Loss Data 2420. This Customer Loss Data 2420 may be compared against the expected customer loss as modeled by the Tuned Loss Model 2310 by the Event Evaluator 2408. The difference between expected customer loss and actual loss over a given time period may then indicate how well the retention Stratagem 2410 worked. The Event Evaluator 2408 may then compile this data into a Retention Validation Report 2430.

B. Customer Retention Analysis

Figure 25:
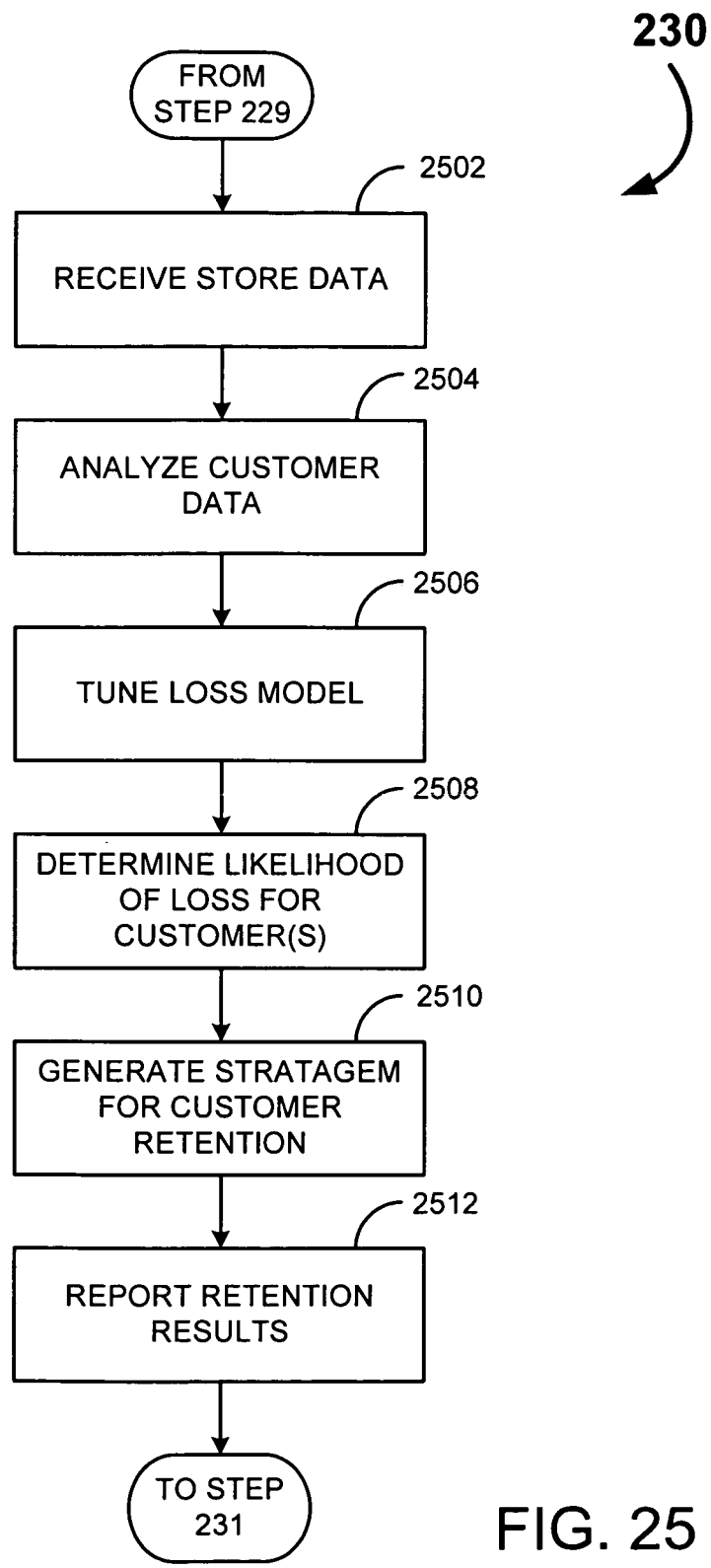
FIG. 25 is a flow chart depicting a process flow by which customer retention may be analyzed in accordance with some embodiment of the present invention.

FIG. 25 is a flow chart depicting a process flow by which customer retention may be analyzed, shown generally at 230. As previously noted, this process may be standalone or may be integrated into a larger pricing optimization. The process begins from step 229 of FIG. 2 when the process is part of the optimization for product pricing. The process then progresses to step 2502 where customer data is received from the stores. Then, at step 2504 the customer data is analyzed. Data analysis may include identification of "high value" customers and cleansing of a subset of the raw customer data.

The cleansed data may then be used, at step 2506 to tune the loss model. This may include utilizing a figure of merit function to align the loss model more closely to the actual data. In some embodiments, tuning of the loss model may only occur when there has been a larger than anticipated discrepancy between previous actual data and the loss model.

The process then progresses to step 2508 where the likelihood of loss for each customer is determined by comparing the cleansed customer data to the loss model. From the likelihood of loss and the loss model, one or more stratagems for customer retention may be generated (Step 2510). Then, the retention results may be reported at step 2512. The process then concludes by progressing to step 231 of FIG. 2.

Figure 26:
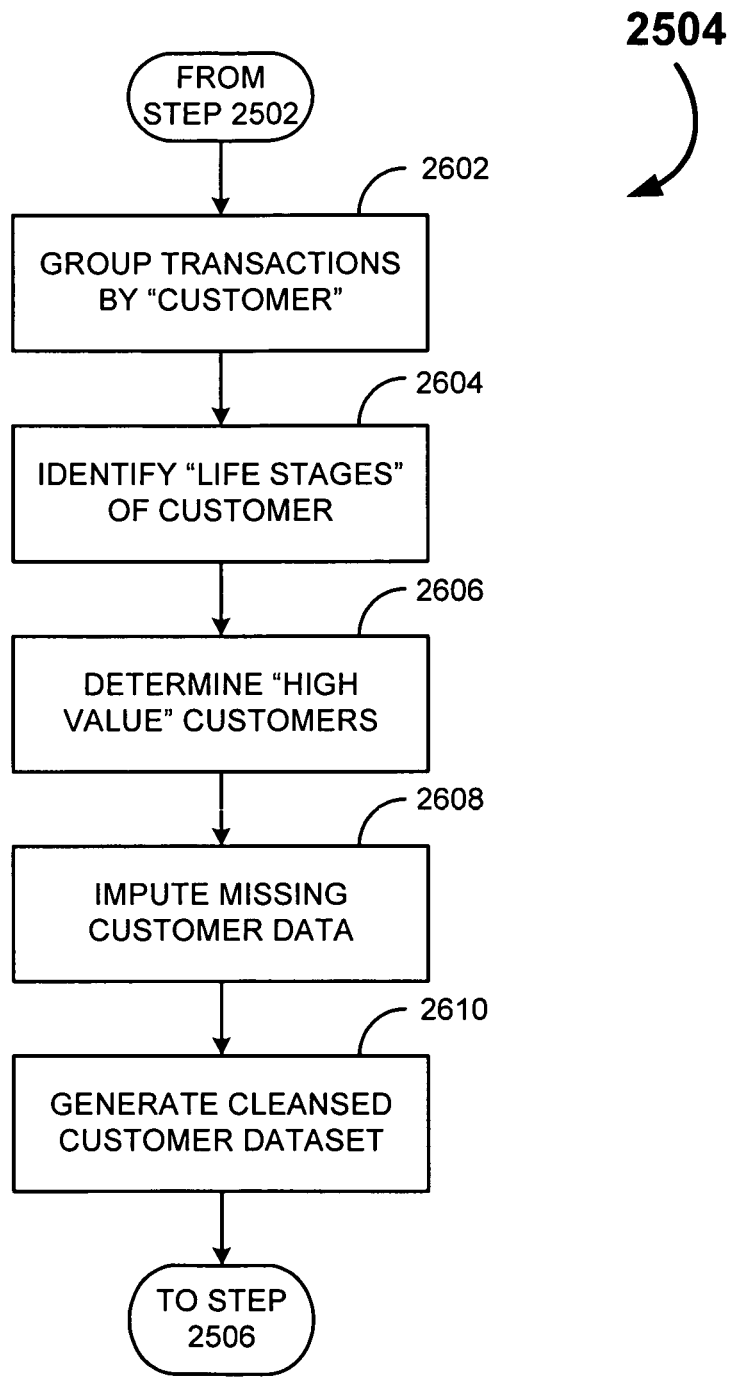
FIG. 26 is a flow chart depicting a process flow by which customer data is analyzed for customer retention in accordance with some embodiment of the present invention.

FIG. 26 is a flow chart depicting a process flow by which customer data is analyzed for customer retention, shown generally at 2504. The process begins from step 2502 of FIG. 25. The process then progresses to step 2602 where transactions are grouped by customer. Customer for the purposes of retention analysis may include any consuming entity, including, but not limited to, an individual, a household, an organization, a corporation, or a social group. Such groupings may be performed by association of the customer with one or more identifiers. As previously noted, such identifier may include payment identity (credit card information, check account number, debit, etc.), loyalty program (account number, loyalty card, phone number, etc.), statistical purchasing profile and habit, biometric data or database query (such as by drivers license number). Conflicts in identity information may be resolved by disregarding the identifier information deemed 'less accurate'. Such conflict resolution may require that identity sources be ranked in order of priority.

After grouping transactions by customer, the process then progresses to step 2604 where "life stages" of the customer may be identified. For example, for a household customer, the purchase of diapers and formula would identify the customer as a young family with one or more infant children. This immediate profile of the customer may provide information as to likely behaviors, and may likewise explain changes in purchasing behavior over time. Continuing the example, total purchases may decrease after 3 years. The purchases of food will gradually increase over the following 12 years. There may be a dramatic decrease in household consumables after 18 years of purchase history.

The process then progresses to step 2606 where "high value" customers are identified. As previously noted, high value may refer to total expenditures, profit realized, or any other appropriate criteria. In some embodiments, the customer above some threshold of expenditure may qualify as "high value". In other embodiments, only the top quantiles of customers may qualify as "high value". For example, "high value" customers may be configured to include the top X % of customers when ranked by total dollars spent (this customer set could account for a much larger Y % of the total revenues. For example, the top 10% of the customers could easily account for the 30% of the retail revenues). Also, in some embodiments, more complicated evaluation metrics of "high value" may be realized including complex, multi variable formulas including, but not limited, to the loss value examples provided previously. Other examples would include, but not limited to, balancing short term (retail financial metric) and long term goals (customer loyalty, customer life-time value, etc.).

The process then progresses to step 2608 where any missing customer data may be imputed. Missing data may occur when the customer is temporarily unavailable (i.e., vacation), and where data feeds are incomplete. Such data imputation may be performed for data entries which correspond to "high value" customers. Then, at step 2610 the cleansed dataset is generated for the customer data. The cleansed data set includes transaction identifiers and may include entries for high value customers. The process then concludes by progressing to step 2506 of FIG. 25.

Figure 27:
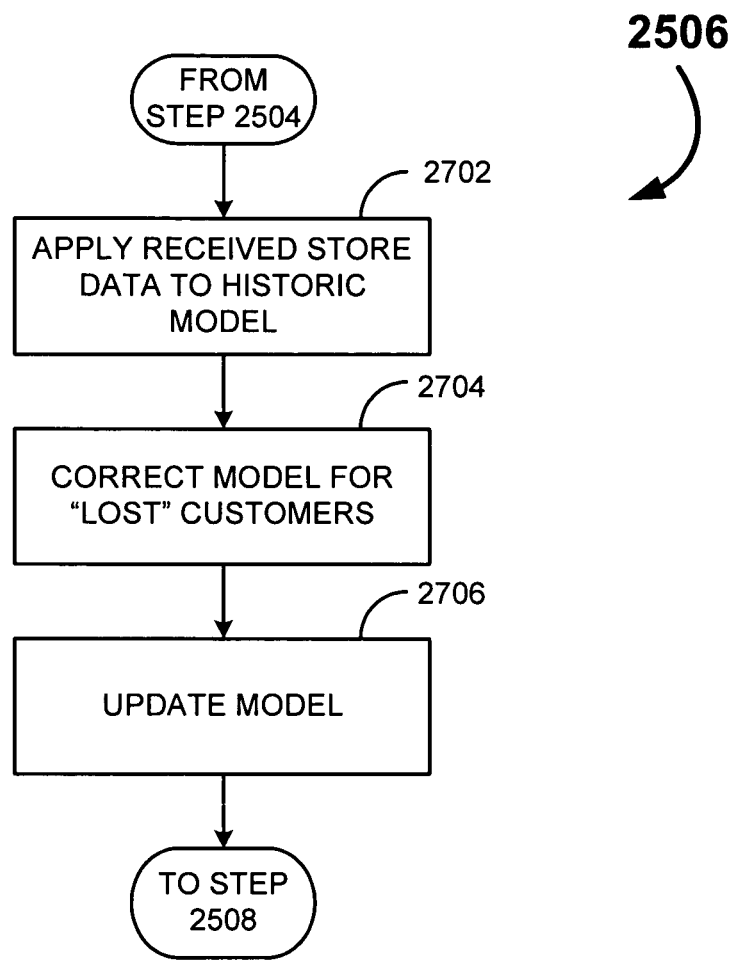
FIG. 27 is a flow chart depicting a process flow by which a loss model is tuned for customer retention in accordance with some embodiment of the present invention.

FIG. 27 is a flow chart depicting a process flow by which a loss model is tuned for customer retention, shown generally at 2506. The process begins from step 2504 of FIG. 25. The process then progresses to step 2702 where the customer data received from the store(s) is applied to historic loss model. This application of actual data to the model may include utilizing a figure of merit function. The model is then corrected for "lost" customers (where lost could be defined in multiple ways for business interpretation. For example, it could include a percentage decline in a historical measure such as frequency, or spend, or profits, or various combinations thereof. It may also include declines in metrics such as life-time value (defined as total potential revenue expected over the lifetime of a customer assuming he/she continues exact same behavior), category penetration (defined as number of categories shopped, or the number of distinct UPCs within a category, or fraction of spend in a given category as compared to other average/segment shoppers), share-of-wallet (defined as the fraction of budget an individual spends at a given retailer), etc.

Historically, it has been found that frequency of purchases, and recency of purchases are highly predictive measures of a customer's likelihood of leaving. Other factors are generally weak predictors in light of the frequency factor and recency factor. Thus, the ability to predicatively model likelihood of loss is overshadowed by a customer's purchasing frequency. However, frequency of purchasing and recency of purchases may include false data points, as unidentified customers who have already been lost are feeding into the frequency factor and length of time since the most recent purchase factor. Thus, by correcting for the biases due to lost customers (step 2704), the model more accurately reflects the roles frequency and recency play in predicting loss, and enables the loss model to be more sensitive to other "true" predictors of loss.

Some aspects of the model may identify customers at high risk of value loss who are essentially beyond the reach of retention efforts. It is important that this model focus on customers whose value may be retained. This entails care in avoiding dominance of predictors that have impacts that are more mechanistic than behavioral as well as diligence and creativity in developing the predictive power of different patterns of shopping behavior.

The final model may then be updated at step 2706. The process then concludes by progressing to step 2508 of FIG. 25.

Figure 28:
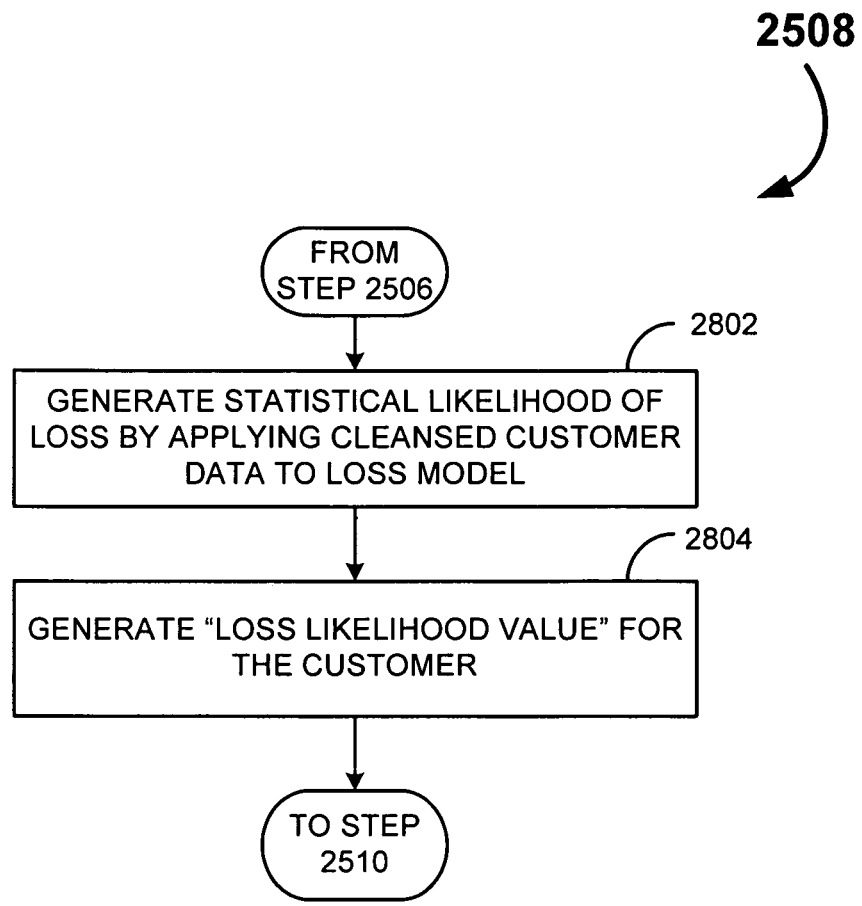
FIG. 28 is a flow chart depicting a process flow by which customer likelihood of loss is determined for customer retention in accordance with some embodiment of the present invention.

FIG. 28 is a flow chart depicting a process flow by which customer likelihood of loss is determined for customer retention, shown generally at 2508. The process begins from step 2506 of FIG. 25. The process then progresses to step 2802 where the statistical likelihood of customer loss may be generated by applying the updated loss model to the cleansed customer data. This raw statistical measure of loss likelihood may be outputted for retention measure generation.

Examples of factors compared in the determining of the customer's likelihood of attrition include, but are not limited to, the following causal factors:
1) Customer shopping behavior
   a) Purchase patterns for canonical categories to determine/predict decline (e.g., baby products, paper shopping pattern vs. Year ago, etc.). The list of canonical categories could be provided or could be constructed based upon other financial metrics computed at aggregate levels.
   b) Influence of client specific product offering (i.e., % of Consumer Brand items in basket by category)
   c) Changes in Net price per item (especially in canonical categories)
   d) Frequency of trips and intra-trip durations
   e) Length of customer relationship with chain/retail-location
   f) Customers' pattern of trip-types and changes in the patterns
   g) Customer Price Sensitivity
   h) Similarity of a customer's shopping pattern with that of the primary store segment population
   i) Customer calls to call center with complaints or suggestions
2) Promotions
   a) Frequency and duration of promotion in the categories purchased by customer Household (HH)
   b) Promotion frequency on canonical categories
3) Influence of the client store
   a) Elitist, non-elitist stores
   b) Recency of store update/remodel date
   c) Square footage and Departments in the store (i.e., fuel, coffee shop, deli)
   d) Increase or decrease in service rates of primary store (accounts for shopping at multiple locations of the same retailer)
4) Influence of competitors
   a) Distance of competitors to primary store by competitor type
   b) Date competitor store was opened
   c) Competitor pricing The process then progresses to step 2804 where the loss value, or loss likelihood value, for the customer may be generated. This loss value may include a metric of the loss likelihood for the customer in relation to the value rating of the customer. Again, loss value may be outputted for business decision making, customer service resolution and investor relations. The process then concludes by progressing to step 2510 of FIG. 25.

Figure 29:
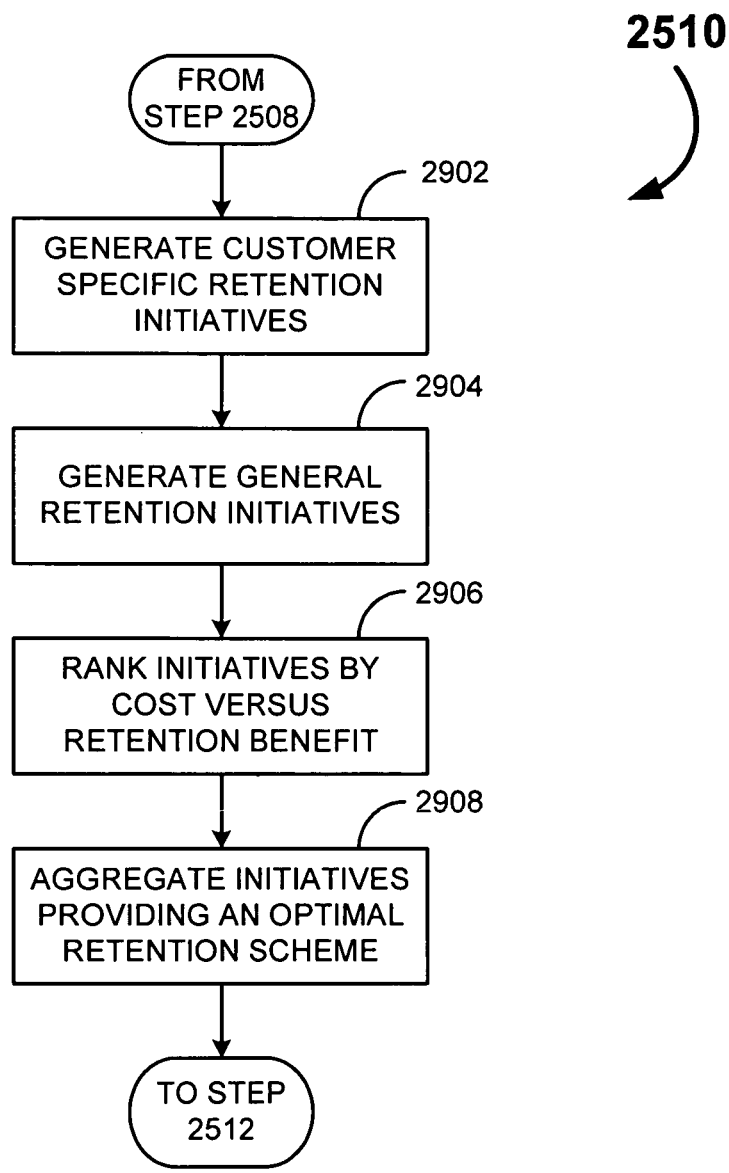
FIG. 29 is a flow chart depicting a process flow by which a customer retention stratagem may be generated for customer retention in accordance with some embodiment of the present invention.

FIG. 29 is a flow chart depicting a process flow by which a customer retention stratagem may be generated for customer retention, shown generally at 2510. The process begins from step 2508 of FIG. 25. The process then progresses to step 2902 where customer specific retention initiatives are generated. These initiatives may be generated for customers which are considered "at risk" for attrition. These measures may include personalized advertisements, personalized promotions or other personal treatment, or change in product assortment to meet customer's needs. The customer behavioral, life stage, and purchasing profiles may by utilized to generate a promotion or advertisement which is particularly effective for targeting the particular customer. Likewise, expenditure of cost associated with the promotion or advertisement may depend upon the likelihood of loss for the customer, or in some embodiments, may depend upon the customer's "loss value" as found at step 2804 of FIG. 28.

The process then progresses to step 2904 where general retention initiatives are generated. These general retention initiatives may include global promotions, store remodels and advertisements. Unlike the promotions generated during the optimization process, the retention promotions aim to reduce the level of customer attrition rather than achieve a profit or volume maximization. In this manner, we can achieve a balance between short term and long terms behaviors of customers.

The initiatives are ranked at step 2906 by their relative costs and benefits. Thus, the most cost efficient retention initiatives may be ranked highest. This enables an aggregate or integrated-strategy measure to be generated at step 2908.

The integrated-strategy measure may compare allowable budget for retention to the ranked retention initiatives. In some embodiments, all retention measures of the ranked retention measures may be compared to a threshold for their cost benefit in order to select measures for the retention scheme. The process then concludes by progressing to step 2512 of FIG. 25.

Figure 30:
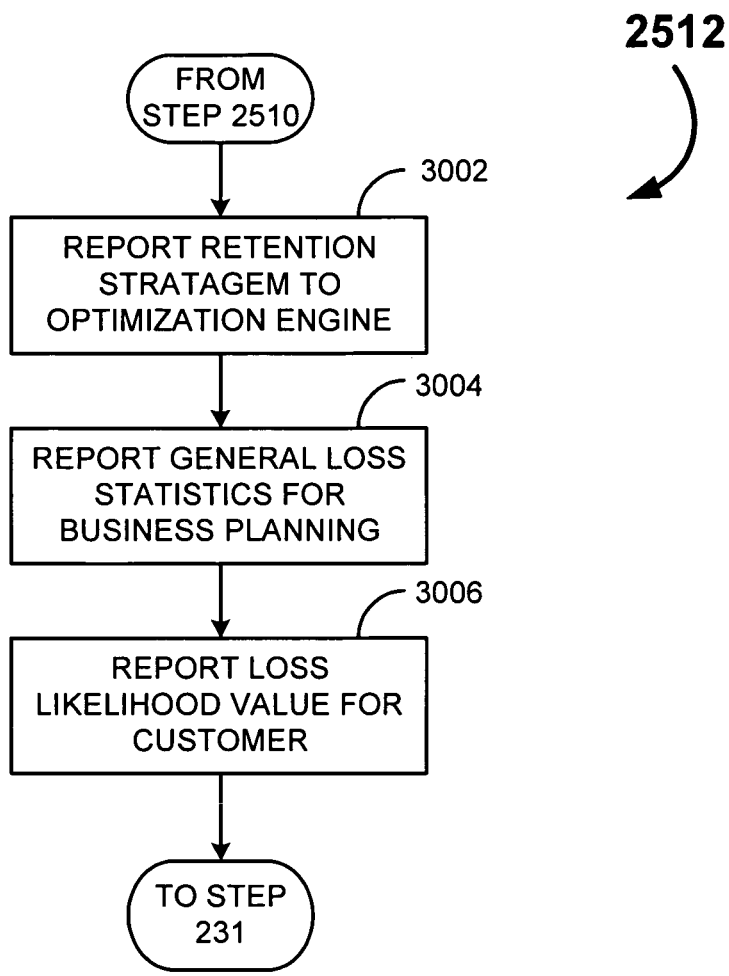
FIG. 30 is a flow chart depicting a process flow by which retention results may be reported for customer retention in accordance with some embodiment of the present invention.
Figure 31A:
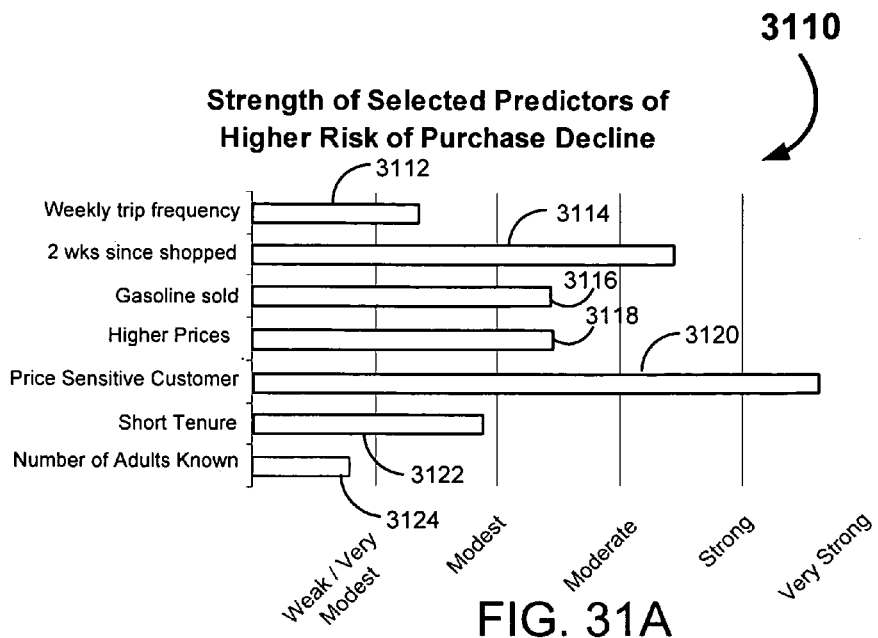
FIG. 31A illustrates a chart showing relative strength of high risk purchase decline predictors for customer retention analysis in accordance with some embodiment of the present invention.

FIG. 30 is a flow chart depicting a process flow by which retention results may be reported for customer retention, shown generally at 2512. The process begins from step 2510 of FIG. 25. The process then progresses to step 3002 where the retention stratagem is reported to the optimization engine, assuming that in this exemplary embodiment the Customer Retention Engine 150 is a component of a greater pricing optimization system rather than a standalone business tool. Then, at step 3004 the general attrition statistics may be reported for business planning and investor relations purposes. Such a general report may include loss likelihood summarizations in chart and table formats.

The process then progresses to step 3006 where the loss value for each customer is reported. This may be performed via an enterprise network or via individual printouts or a web-based user interface for the customers. The process then concludes by progressing to step 231 of FIG. 2.

The loss value may be estimated by means of different statistical models. Below is outlined a particular exemplary approach, fully recognizing other approaches (such as using a point process model such as Poisson arrival process for customer purchases, negative-binomial distribution or the logistic regression errors etc.) could be applied. The following approach leverages logistic regression models.

$$\log\left(\frac{x_{c,s}(t)}{1-x_{c,s}(t)}\right) = A_1(c,s)V_1(c,s,t) + A_2(c,s)V_2(c,s,t) + \ldots + A_N(c,s)V_N(c,s,t) + \text{Intercept} + \varepsilon(t)$$

where, $x_{c,s}(t)$ represents the measure of customer retention for customer 'c' and shopping in store 's'. It may be either the percent decline in the spend or a 0 or 1 outcome pertaining to whether the customer was retained in the period 't' or not.

$A_1(c,s), \ldots, A_N(c,s)$ are the coefficients for different effects such as store-size, demographics, etc. The coefficients are typically computed at customer or customer segment level ('c') and could pertain to a store 's'. There could be cases where the store dimension 's' is not applicable, in which case the same value would be used for all occurrences of the stores. One such example would be the number of family members, which doesn't change by store (but may change over time as a result of events such as birth, death, etc.).

$V_1(c,s,t), \ldots, V_N(c,s,t)$ are the actual independent variables being considered collected at customer or customer segment level ('c') and could pertain to a store 's' and at time 't'. There is considered many different sets of explanatory/independent variables $V_1(c,s,t)$ and they are evaluated for the corresponding explanatory coefficients $A_1(c,s)$.

Finally $\varepsilon(t)$ represents the random errors from the prediction model. As mentioned before, we can support different error types assuming that various errors $\varepsilon(t)$ in different time periods are independent of one another and are drawn from the same probability distribution. It is also possible to impose various relationships between these errors (via an error covariance structure). All these variations can readily be applied in our context.

Below is a listing of some example variables that have been considered. It is clear that this scheme may be extended to include additional variables as is desired. Limitations on variables included are purely based upon the availability of corresponding data.

For example, the term $V_1(c,s,t)$ may represent store quality in time 't'; number of purchases by a customer (or customer segment) 'c' at store 's' at time 't'; number of different categories purchased by a customer (or customer segment) 'c' at store 's' at time 't'; tenure of a customer (or customer segment) 'c' at time 't'; average time between purchases (in weeks) by a customer (or customer segment) 'c' at time 't'; time since last purchase by a customer (or customer segment) before time 't' in weeks; demographic information for a customer (or customer segment) 'c' at time 't'; segment to which the customer (or customer segment) 'c' belongs at time 't' (this segment classification would be the same for all the stores); number of competitive stores for the given store 's' at time 't' (note that in this case the customer dimension has no effect and this remains the same for all customers 'c' that are shopping at store 's'); the number of children at the customer household at time 't'; whether store 's' has a deli (or other feature) at time 't'; an indicator of the relative prices at customer store 's' compared to its competitors (either at the whole store level, basket level, category level or some other aggregated level. Aggregation may be based upon schemes including, but not limited to, weighting schemes employing market share or actual sales volumes of the aggregate level i.e. store level or basket level sales).

Of course additional factors may be developed as is desired for efficient retention analysis.

C. Example Retention Factors

FIG. 31A illustrates an exemplary chart showing relative strength of high risk purchase decline predictors for customer retention analysis, shown generally at 3110. The horizontal axis lists relative strengths of factors which predict a high risk of purchase decline (customer attrition). The vertical axis lists some exemplary factors. It may be seen that the two largest factors for predicting customer attrition in this example are 1) customers who are sensitive to price, shown at 3120, and 2) the frequency of purchases, shown at 3114. As previously noted, the loss model may be corrected for customers who have already left; regardless, frequency remains an important factor in determining customer attrition.

Additional factors that weigh in favor of customer attrition include, in descending order of importance, where higher prices than a competitor (shown at 3118), if the store sells gasoline (shown at 3116), a short tenure for the customer (shown at 3122), customers who shop very frequently (shown at 3112) and the number of adults in a household is unknown (shown at 3124).

Figure 31B:
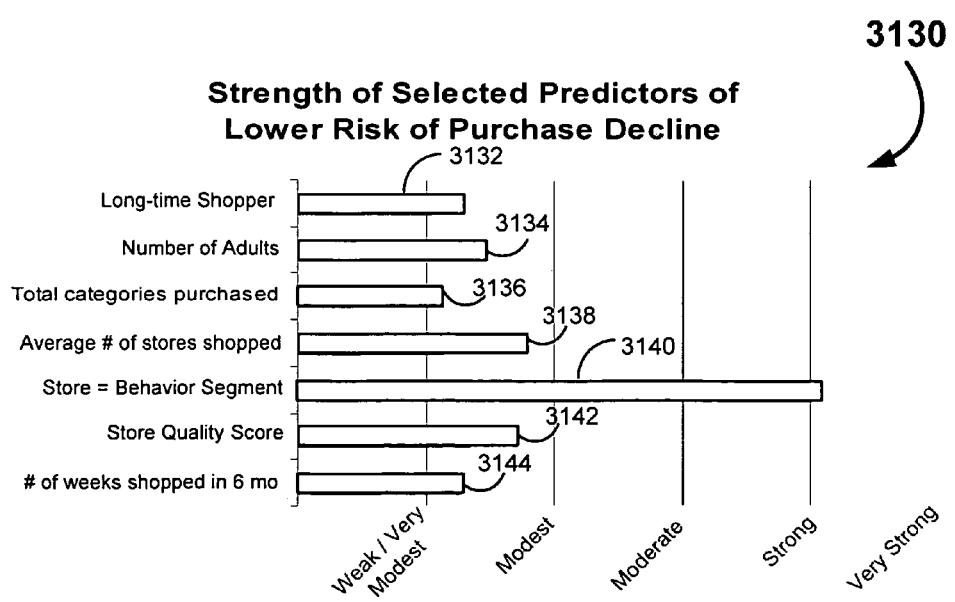
FIG. 31B illustrates a chart showing relative strength of low risk purchase decline predictors for customer retention analysis in accordance with some embodiment of the present invention.
Figure 32:
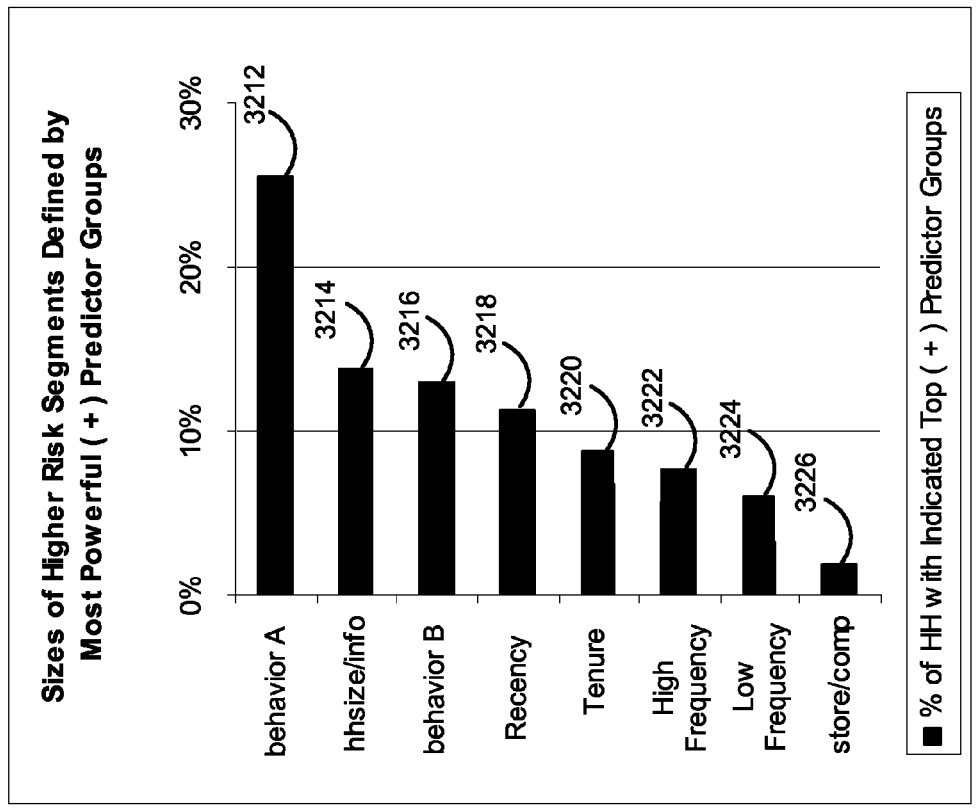
FIG. 32 illustrates a chart showing sizing of higher risk segments for customer retention analysis in accordance with some embodiment of the present invention.

FIG. 31B illustrates an exemplary chart showing relative strength of low risk purchase decline predictors for customer retention analysis, shown generally at 3130. The horizontal axis lists relative strengths of factors which predict a low risk of purchase decline (customer retention). The vertical axis lists some exemplary factors. It may be seen that the single largest factor for predicting a low risk of customer attrition in this example is customers who shop at stores which match their behavioral segment, shown at 3140.

Additional factors that weigh in favor of a low risk of customer attrition include, in descending order of importance, customers who shop a large number of stores on average (shown at 3138), where the store is of high quality (shown at 3142), the number of adults in the customer household (shown at 3134), the long time tenure of the shopper (shown at 3132), number of weeks shopped during the last 6 months (shown at 3144), and the total categories of items purchased (shown at 3136).

FIG. 32 illustrates an exemplary chart showing sizing of higher risk segments for customer retention analysis, shown generally at 3210. Groups at high risk of attrition are arranged vertically, identified by the strongest predictive factor of that risk. The percentages of high risk customers that fall into each group are represented by the horizontal lengths of bars. The vertical axis lists the groups which have a high risk of customer attrition. It may be seen that those customers with a particular behavioral category 3212 are the largest groups of at risk customers; next is customer households with incomplete demographic data 3214; this is followed by another behavioral category 3216, very high-frequency shoppers with gaps in their recent shopping 3218; customers with a short tenure 3220, very high-frequent shoppers 3222, respectively; low frequency shoppers 3224; and lastly stores with strong competitors 3226.

VI. System Platform

Figure 7A:
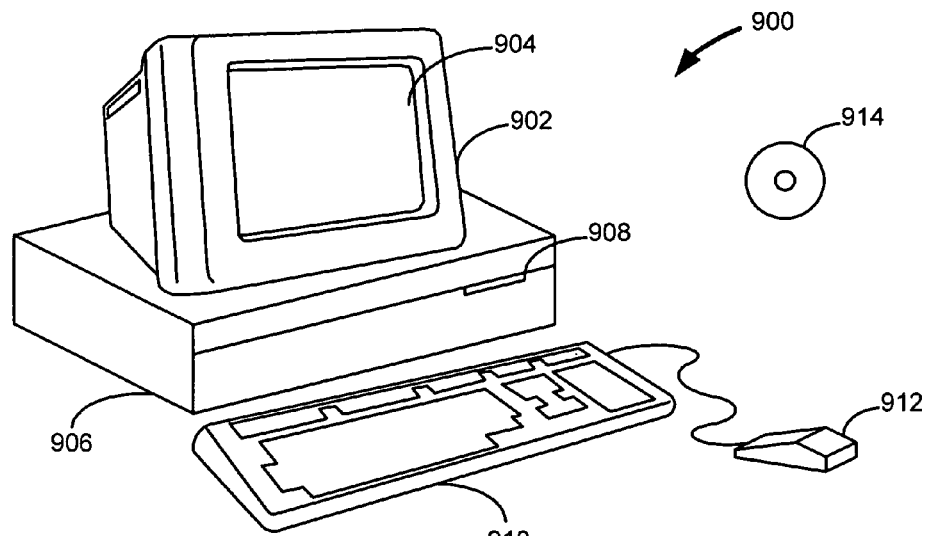
FIGS. 7A and 7B illustrate a computer system, which forms part of a network and is suitable for implementing embodiments of the present invention.
Figure 7B:
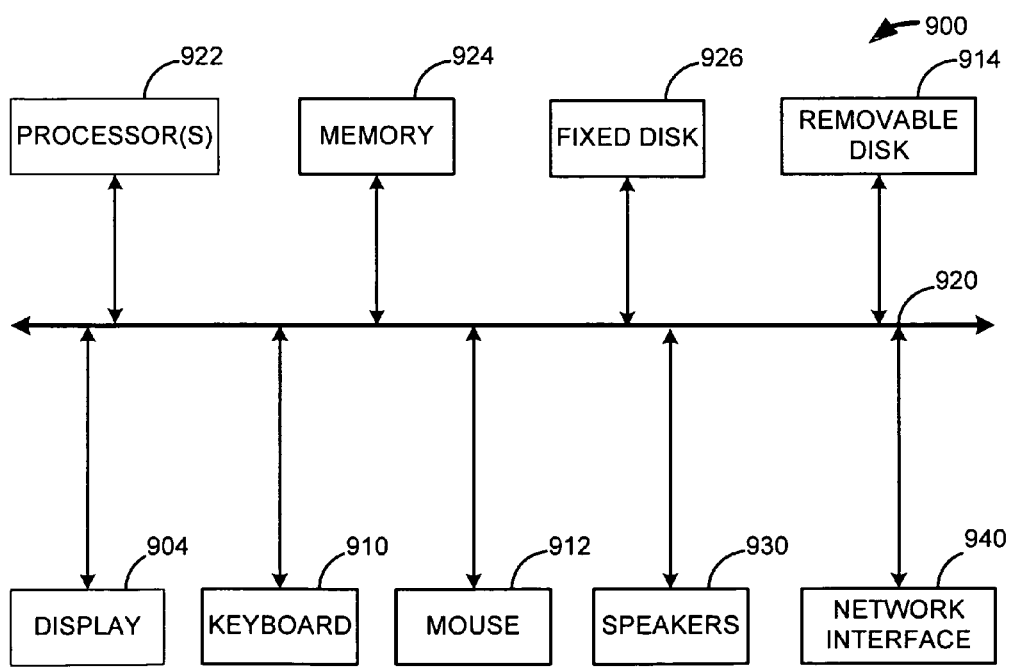

FIGS. 7A and 7B illustrate a computer system 900, which forms part of the network 10 and is suitable for implementing embodiments of the present invention. FIG. 7A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Figure 8:
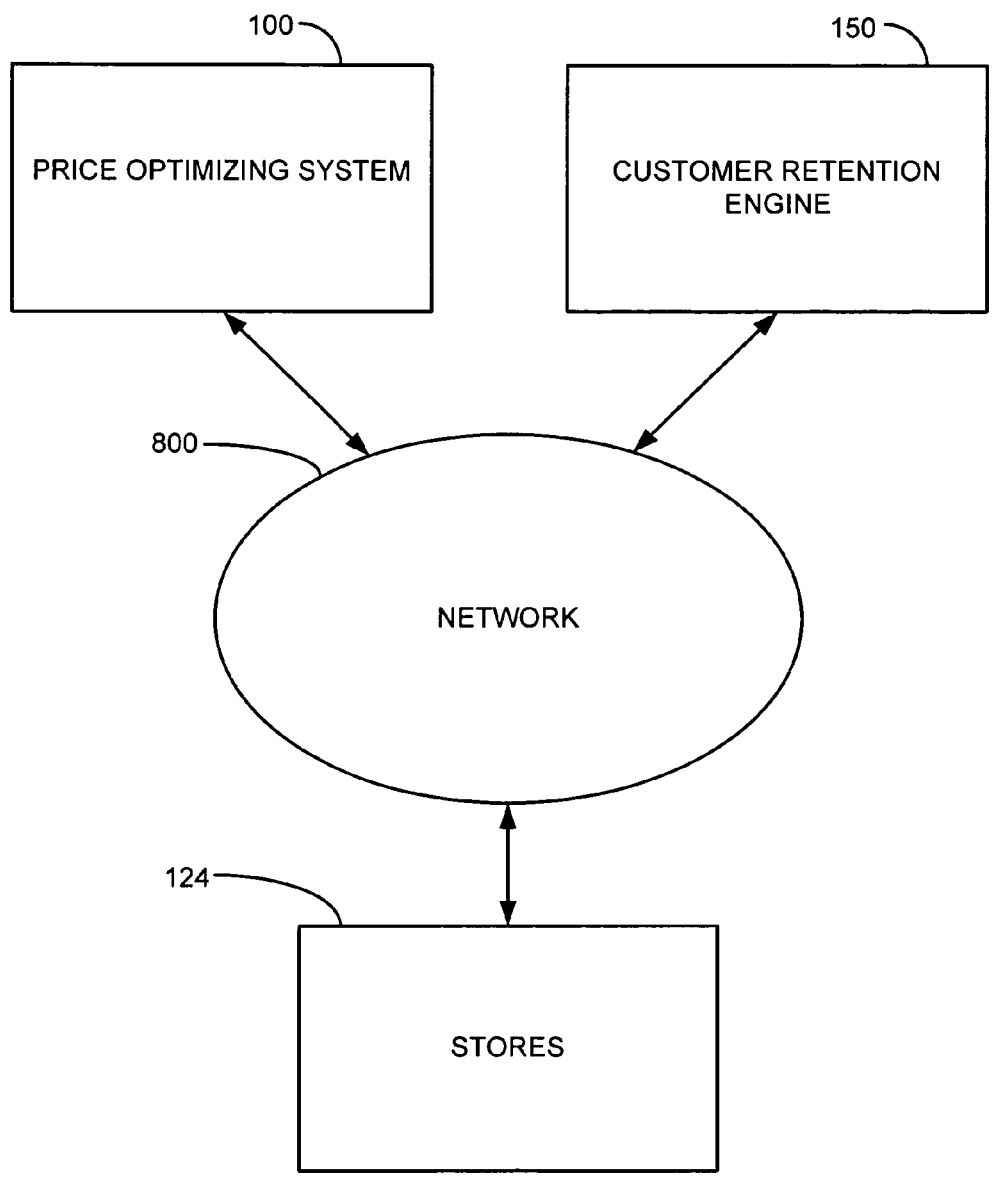
FIG. 8 is a schematic illustration of an embodiment of the invention that functions over a network.
Figure 9A:
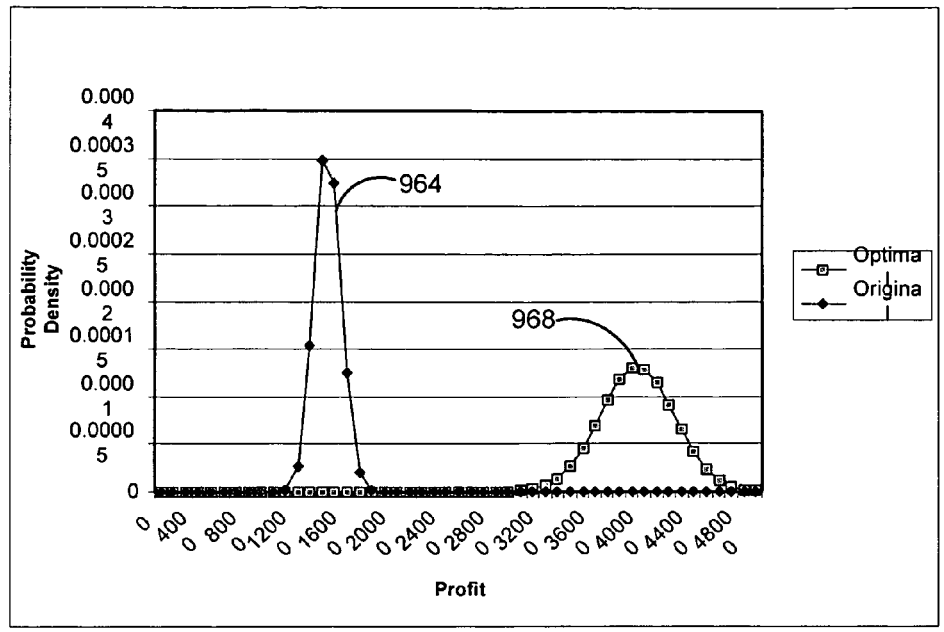
FIG. 9A is a graph of original profit from actual sales of the store using actual prices and optimal profit from optimized sales resulting from the calculated optimized prices bounded by its probability.
Figure 9B:
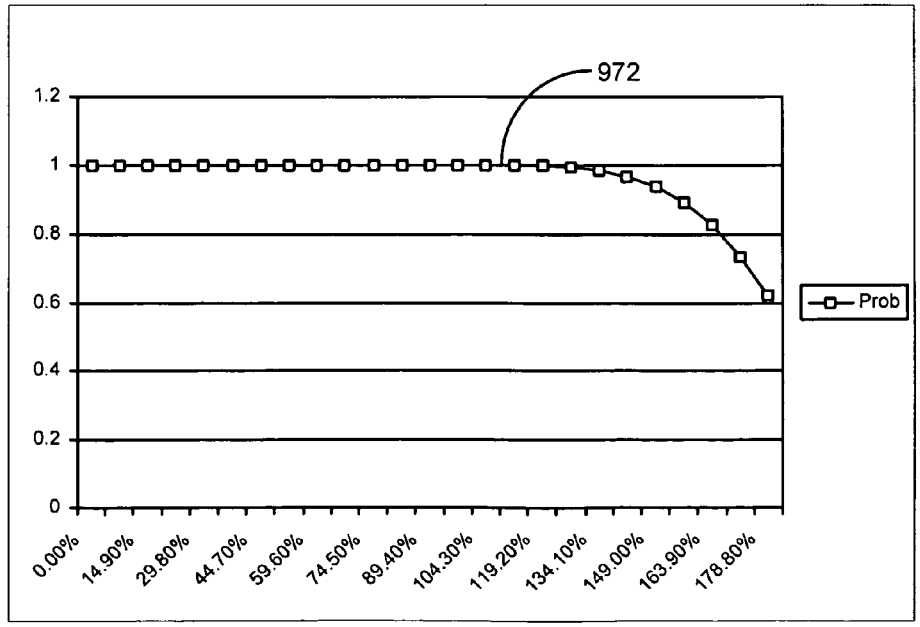
FIG. 9B is a graph of percentage increase in profit and the probability of obtaining at least that percentage increase in profit.

FIG. 8 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an embodiment, the Price Optimizing System with Active Customer Retention 100 is connected to the network 800. The Stores 124 are also connected to the network 800. The Stores 124 are able to bi-directionally communicate with the Price Optimizing System with Active Customer Retention 100 over the network 800. Additionally, in embodiments where the Customer Retention Engine 150 is not integrated within the pricing optimization system, the Stores 124 are likewise able to bi-directionally communicate with the Customer Retention Engine 150 over the network 800.

Additionally, in some embodiments, the system may be hosted on a web platform. A browser or similar web component may be used to access the Likelihood of loss engine. By utilizing internet based services, retailers may be able to access the system from any location.

In the specification, examples of product are not intended to limit products covered by the claims. Products may for example include food, hardware, software, real estate, financial devices, intellectual property, raw material, and services. The products may be sold wholesale or retail, in a brick and mortar store or over the Internet, or through other sales methods.

In sum, the present invention provides a system and methods for predicting the likelihood of customer attrition and for generating retention measures. The advantages of such a system include cost efficient retention of high value customers and possible downstream efficiency increases of a pricing optimization.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for predicting likelihood of customer attrition, useful in association with at least one customer, the method comprising:
    receiving historical data from at least one store, wherein the historical data includes historical transactions, and wherein the historical transactions are associated with historical customers;
    receiving customer data for a plurality of customers from the at least one store, wherein the customer data includes transactions;
    identifying at least one customer that provides economic value to at least one store from the plurality of customers;
    linking each corresponding transaction of the customer data with one of the at least one customer and producing a reduced set of data limited to the at least one customer for faster processing;
    identifying attriters, wherein the attriters are the historical customers who engage in an attrition behavior during the historical data;
    identifying risk factors for attrition from the historical data, wherein the risk factors are defined by the historical transactions;
    generating a loss model, using a computer, utilizing the identified risk factors, wherein generating the loss model comprises:
        tuning the loss model in response to a difference between previous actual data and data generated by the loss model exceeding an expected discrepancy, wherein tuning the loss model includes correcting the loss model for biases produced by lost customers and to filter customers that are beyond being retained by retention measures;
    generating likelihood of loss for each of the at least one customer, using the computer, by comparing the linked transactions to the loss model;
    generating and validating at least one retention measure for the at least one customer using the computer, wherein validating includes:
        calculating actual customer loss from applying the at least one retention measure at the at least one store;
        modeling an expected customer loss via the loss model; and
        determining a difference between the actual customer loss and the expected customer loss generated by the loss model over a time period to indicate an effectiveness of the at least one retention measure over that time period; and
    controlling processing of the computer to process the reduced set of data limited to the at least one customer to increase performance speed.

2. The method recited by claim 1, wherein the attrition behavior is defined by configurable criteria.

3. The method recited by claim 2, wherein the attrition behavior is defined as at least one of customers who discontinue shopping, customers who stop shopping in a given time frame, and decline in average purchase size from a historical basis.

4. The method recited by claim 1, wherein the at least one retention measure is generated by comparing the linked transactions to the loss model and the risk factors.

5. The method recited by claim 1, further comprising calibrating the loss model by discounting a frequency risk factor of the attriters after date of attrition.

6. The method recited by claim 1, further comprising identifying high value customers from the plurality of customers.

7. The method recited by claim 1, wherein the risk factors include at least one of behavioral categories, tenure, basket value, number of adults, available customer information, number of stores shopped at, store quality, competitor type, frequency, and gaps in shopping frequency.

8. The method recited by claim 1, wherein the linking each corresponding transaction utilizes at least one of payment identifiers, loyalty program identifiers, registry identifiers, and biometric identifiers.

9. The method recited by claim 8, wherein conflicts between identifiers utilized for linking each corresponding transaction are resolved in favor of a most accurate identifier.

10. The method recited by claim 1, further comprising cleansing the received customer data from at least one store.

11. The method recited by claim 4, further comprising outputting the at least one retention measure to the at least one store.

12. The method recited by claim 1, further comprising outputting the at least one retention measure to a price optimization system, whereby the price optimization system uses the at least one retention measure to generate a preferred set of prices for one or more products, and wherein the preferred set of prices is configured to limit customer loss by a set threshold.

13. The method recited by claim 1, further comprising generating a loss value for each of the at least one customer by comparing the likelihood of loss for said customer with an economic value said customer provides the at least one store.

14. An apparatus comprising a likelihood of customer attrition predictor, useful in association with at least one customer, the likelihood of customer attrition predictor comprising:
    a data analyzer including a processor configured to receive historical data from at least one store, wherein the historical data includes historical transactions, and wherein the historical transactions are associated with historical customers, and wherein the data analyzer further is configured to receive customer data for a plurality of customers from the at least one store and to identify at least one customer that provides economic value to at least one store from the plurality of customers, wherein the customer data includes transactions, and wherein the data analyzer further is configured to identify attriters, wherein the attriters are the historical customers who engage in an attrition behavior during the historical data;
    an identity determiner including a processor configured to link each corresponding transaction of the customer data with one of the at least one customer and produce a reduced set of data limited to the at least one customer for faster processing;
    a loss model engine including a processor configured to:
        identify risk factors for attrition from the historical data, wherein the risk factors are defined by the historical transactions;
        generate a loss model utilizing the identified risk factors, wherein generating the loss model comprises:

tuning the loss model in response to a difference between previous actual data and data generated by the loss model exceeding an expected discrepancy, wherein tuning the loss model includes correcting the loss model for biases produced by lost customers and to filter customers that are beyond being retained by retention measures;

a likelihood of loss determiner including a processor configured to generate likelihood of loss for each of the at least one customer by comparing the linked transactions to the loss model; and a stratagem generator configured to:
generate at least one retention measure for the at least one customer; and
validate the at least one retention measure by:
calculating actual customer loss from applying the at least one retention measure at the at least one store;
modeling an expected customer loss via the loss model; and
determining a difference between the actual customer loss and the expected customer loss generated by the loss model over a time period to indicate an effectiveness of the at least one retention measure over that time period;
wherein the processing of the loss model engine, likelihood of loss determiner, and stratagem generator performed by the corresponding processors are controlled to process the reduced set of data limited to the at least one customer to increase performance speed.

15. The apparatus of claim 14, wherein the data analyzer is enabled to define the attrition behavior by configurable criteria.

16. The apparatus of claim 15, wherein the attrition behavior is defined as at least one of customers who discontinue shopping, customers who stop shopping in a given time frame, and decline in average purchase size from a historical basis.

17. The apparatus of claim 14, wherein the at least one retention measure is generated by comparing the linked transactions to the loss model and the risk factors.

18. The apparatus of claim 14, wherein the loss model engine is further configured to calibrate the loss model by discounting a frequency risk factor of the attriters after date of attrition.

19. The apparatus of claim 14, further comprising a valuable customer identifier configured to identify high value customers from the plurality of customers.

20. The apparatus of claim 14, wherein the risk factors include at least one of behavioral categories, tenure, basket value, number of adults, available customer information, number of stores shopped at, store quality, competitor type, frequency, and gaps in shopping frequency.

21. The apparatus of claim 14, wherein the linking each corresponding transaction utilizes at least one of payment identifiers, loyalty program identifiers, registry identifiers, and biometric identifiers.

22. The apparatus of claim 21, wherein conflicts between identifiers utilized for linking each corresponding transaction are resolved in favor of a most accurate identifier.

23. The apparatus of claim 14, further comprising a data cleanser configured to cleanse the received customer data from at least one store.

24. The apparatus of claim 17, further comprising an outputter configured to output the at least one retention measure to the at least one store.

25. The apparatus of claim 14, further comprising an outputter configured to output the at least one retention measure to a price optimization system, whereby the price optimization system uses the at least one retention measure to generate a preferred set of prices for one or more products, and wherein the preferred set of prices is configured to limit customer loss by a set threshold.

26. The apparatus of claim 14, further comprising a loss value generator configured to generate a loss value for each of the at least one customer by comparing the likelihood of loss for said customer with an economic value said customer provides the at least one store.

27. A computer storage product for predicting likelihood of customer attrition, useful in association with at least one customer, comprising:
a non-transitory computer readable medium having computer readable program code embodied therewith for execution on one or more processors, the computer readable program code comprising computer readable program code configured to:
receive historical data from at least one store, wherein the historical data includes historical transactions, and wherein the historical transactions are associated with historical customers;
receive customer data for a plurality of customers from the at least one store, wherein the customer data includes transactions;
identify at least one customer that provides economic value to at least one store from the plurality of customers;
link each corresponding transaction of the customer data with one of the at least one customer and produce a reduced set of data limited to the at least one customer for faster processing;
identify attriters, wherein the attriters are the historical customers who engage in an attrition behavior during the historical data;
identify risk factors for attrition from the historical data, wherein the risk factors are defined by the historical transactions;
generate a loss model utilizing the identified risk factors, wherein generating the loss model comprises:
tuning the loss model in response to a difference between previous actual data and data generated by the loss model exceeding an expected discrepancy, wherein tuning the loss model includes correcting the loss model for biases produced by lost customers and to filter customers that are beyond being retained by retention measures;
generate likelihood of loss for each of the at least one customer by comparing the linked transactions to the loss model;
generate and validate at least one retention measure for the at least one customer, wherein validating includes:
calculating actual customer loss from applying the at least one retention measure at the at least one store;
modeling an expected customer loss via the loss model; and
determining a difference between the actual customer loss and the expected customer loss generated by the loss model over a time period to indicate an effectiveness of the at least one retention measure over that time period; and
control processing of the one or more processors to process the reduced set of data limited to the at least one customer to increase performance speed.

28. The computer storage product recited by claim 27, wherein the attrition behavior is defined by configurable criteria.

29. The computer storage product recited by claim 28, wherein the attrition behavior is defined as at least one of customers who discontinue shopping, customers who stop shopping in a given time frame, and decline in average purchase size from a historical basis.

30. The computer storage product recited by claim 27, wherein the at least one retention measure is generated by comparing the linked transactions to the loss model and the risk factors.

31. The computer storage product recited by claim 27, wherein the computer readable program code further comprises computer readable program code configured to calibrate the loss model by discounting a frequency risk factor of the attriters after date of attrition.

32. The computer storage product recited by claim 27, wherein the computer readable program code further comprises computer readable program code configured to identify high value customers from the plurality of customers.

33. The computer storage product recited by claim 27, wherein the risk factors include at least one of behavioral categories, tenure, basket value, number of adults, available customer information, number of stores shopped at, store quality, competitor type, frequency, and gaps in shopping frequency.

34. The computer storage product recited by claim 27, wherein the linking each corresponding transaction utilizes at least one of payment identifiers, loyalty program identifiers, registry identifiers, and biometric identifiers.

35. The computer storage product recited by claim 34, wherein conflicts between identifiers utilized for linking each corresponding transaction are resolved in favor of a most accurate identifier.

36. The computer storage product recited by claim 27, wherein the computer readable program code further comprises computer readable program code configured to cleanse the received customer data from at least one store.

37. The computer storage product recited by claim 30, wherein the computer readable program code further comprises computer readable program code configured to output the at least one retention measure to the at least one store.

38. The computer storage product recited by claim 27, wherein the computer readable program code further comprises computer readable program code configured to output the at least one retention measure to a price optimization system, whereby the price optimization system uses the at least one retention measure to generate a preferred set of prices for one or more products, and wherein the preferred set of prices is configured to limit customer loss by a set threshold.

39. The computer storage product recited by claim 27, wherein the computer readable program code further comprises computer readable program code configured to generate a loss value for each of the at least one customer by comparing the likelihood of loss for said customer with an economic value said customer provides the at least one store.

* * * * *